United States Patent
Wolfe et al.

(10) Patent No.: US 11,159,474 B2
(45) Date of Patent: *Oct. 26, 2021

(54) SOCIAL PLATFORM WITH ENHANCED PRIVACY AND INTEGRATED CUSTOMIZATION FEATURES

(71) Applicant: SGROUPLES, INC., Mountain View, CA (US)

(72) Inventors: Jonathan Wolfe, N.E. Albuquerque, NM (US); Mark Weinstein, Mountain View, CA (US)

(73) Assignee: SGROUPLES, INC., Mountain View, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/904,322

(22) Filed: Jun. 17, 2020

(65) Prior Publication Data

US 2020/0322305 A1    Oct. 8, 2020

Related U.S. Application Data

(63) Continuation of application No. 16/734,267, filed on Jan. 3, 2020, now Pat. No. 10,701,025, which is a (Continued)

(51) Int. Cl.
*G06F 15/16* (2006.01)
*H04L 12/58* (2006.01)
(Continued)

(52) U.S. Cl.
CPC ............ *H04L 51/32* (2013.01); *G06Q 30/02* (2013.01); *G06Q 30/0257* (2013.01);
(Continued)

(58) Field of Classification Search
CPC ....... H04M 17/22; G06Q 20/04; G06Q 30/02; G06Q 30/0252; G06Q 50/01;
(Continued)

(56) References Cited

U.S. PATENT DOCUMENTS

| 5,220,501 A | 6/1993 | Lawlor |
| 5,870,724 A | 2/1999 | Lawlor |

(Continued)

FOREIGN PATENT DOCUMENTS

| EP | 1028551 A2 | 8/2000 |
| EP | 2850584 A2 | 3/2015 |

(Continued)

OTHER PUBLICATIONS

Examination report dated Dec. 4, 2020, for AU Application No. 2019246879, five pages.

(Continued)

*Primary Examiner* — Khanh Q Dinh
(74) *Attorney, Agent, or Firm* — Haynes and Boone, LLP

(57) ABSTRACT

The present invention provides a social networking platform offering various services, such as, facilitating aggregation and management of a user's interaction on one or more social networking platforms, offering enhanced control over the level of privacy associated with the flow of user data, offering tools to customize the user's exposure to advertisement-related content on the social networking platform(s), integrating features to control aspects of how data/content is presented to and visualized by the user, empowering the user to multicast direct messages to other users without the other users having to meet certain constraints, empowering the user to create and/or join a group based on messaging threads, and the like. One or more of these enhanced services/features are associated with a powerful framework of authentication/permission model for access control.

20 Claims, 21 Drawing Sheets

Related U.S. Application Data continuation of application No. 16/695,032, filed on Nov. 25, 2019, now Pat. No. 10,652,199, which is a continuation of application No. 16/529,642, filed on Aug. 1, 2019, now Pat. No. 10,491,559, which is a continuation of application No. 14/400,723, filed as application No. PCT/US2013/041032 on May 14, 2013, now abandoned.

(60) Provisional application No. 61/646,736, filed on May 14, 2012.

(51) Int. Cl.
    *G06Q 50/00*  (2012.01)
    *G06Q 30/02*  (2012.01)
    *H04L 29/08*  (2006.01)
    *G06Q 20/04*  (2012.01)

(52) U.S. Cl.
    CPC ....... *G06Q 50/01* (2013.01); *H04L 29/08072* (2013.01); *G06Q 20/04* (2013.01); *H04L 51/16* (2013.01); *H04L 67/10* (2013.01)

(58) Field of Classification Search
    CPC ... H04L 29/08072; H04L 29/06; H04L 51/32; H04L 51/16; H04L 67/10
    USPC .................................. 709/220, 224, 226, 228
    See application file for complete search history.

(56) References Cited

U.S. PATENT DOCUMENTS

| | | | |
|---|---|---|---|
| 6,202,054 B1 | 3/2001 | Lawlor | |
| 6,282,515 B1 | 8/2001 | Speicher | |
| 8,064,590 B2 | 11/2011 | Abhyanker | |
| 8,140,402 B1 | 3/2012 | Mesaros | |
| 8,600,802 B1 | 12/2013 | Tveit | |
| 8,725,858 B1 | 5/2014 | Wu | |
| 8,824,664 B1 | 9/2014 | Ristock | |
| 8,864,354 B2 | 10/2014 | Lorati | |
| 9,106,696 B2 * | 8/2015 | Pahlavan | H04L 63/126 |
| 9,117,203 B2 | 8/2015 | Reilly | |
| 9,191,448 B2 * | 11/2015 | Pahlavan | G06F 9/452 |
| 9,201,561 B2 * | 12/2015 | Montague | G06F 3/0481 |
| 9,300,653 B1 | 3/2016 | Dufel | |
| 9,372,972 B2 | 6/2016 | Coxe | |
| 9,444,894 B2 * | 9/2016 | Pahlavan | H04L 65/1006 |
| 9,525,640 B2 | 12/2016 | Ristock | |
| 9,563,480 B2 | 2/2017 | Messerli | |
| 9,749,780 B2 * | 8/2017 | Huang | H04W 4/02 |
| 9,866,445 B2 * | 1/2018 | Douville | G06F 8/61 |
| 9,946,593 B2 | 4/2018 | Bishop | |
| 9,953,302 B2 | 4/2018 | Hull | |
| 9,956,330 B2 | 5/2018 | Hertwig | |
| 9,978,041 B2 | 5/2018 | Hull | |
| 10,152,722 B2 | 12/2018 | Heath | |
| 10,244,056 B2 * | 3/2019 | Pahlavan | H04L 63/0853 |
| 10,491,559 B1 | 11/2019 | Wolfe et al. | |
| 10,652,199 B2 | 5/2020 | Wolfe | |
| 10,701,025 B2 * | 6/2020 | Wolfe | H04L 51/14 |
| 11,075,876 B1 * | 7/2021 | Wolfe | H04L 51/32 |
| 2002/0038289 A1 | 3/2002 | Lawlor | |
| 2002/0082910 A1 | 6/2002 | Kontogouris | |
| 2004/0117370 A1 | 6/2004 | Dutta | |
| 2006/0242234 A1 | 10/2006 | Counts | |
| 2007/0150856 A1 | 6/2007 | Warner | |
| 2007/0260520 A1 | 11/2007 | Jha | |
| 2008/0040673 A1 | 2/2008 | Zuckerberg | |
| 2008/0120501 A1 | 5/2008 | Jannink | |
| 2008/0294584 A1 | 11/2008 | Herz | |
| 2009/0313318 A1 | 12/2009 | Dye | |
| 2010/0094869 A1 | 4/2010 | Ebanks | |
| 2010/0142516 A1 | 6/2010 | Lawson | |
| 2010/0205254 A1 | 8/2010 | Ham | |
| 2010/0241699 A1 | 9/2010 | Muthukumarasamy | |
| 2010/0268940 A1 * | 10/2010 | Pahlavan | H04L 67/148 713/155 |
| 2010/0268941 A1 * | 10/2010 | Pahlavan | H04L 12/12 713/155 |
| 2011/0055017 A1 | 3/2011 | Solomon | |
| 2011/0055335 A1 | 3/2011 | Reilly | |
| 2011/0225048 A1 | 9/2011 | Nair | |
| 2011/0231489 A1 | 9/2011 | Rathod | |
| 2011/0282944 A1 | 11/2011 | Henderson | |
| 2011/0295661 A1 | 12/2011 | Dodge | |
| 2011/0313994 A1 | 12/2011 | Varshavsky | |
| 2012/0035996 A1 * | 2/2012 | McLean | G06Q 30/02 705/14.16 |
| 2012/0041822 A1 | 2/2012 | Landry | |
| 2012/0203846 A1 | 8/2012 | Hull | |
| 2013/0073336 A1 | 3/2013 | Heath | |
| 2013/0170348 A1 | 7/2013 | Luna | |
| 2013/0211879 A1 | 8/2013 | Holland | |
| 2013/0211925 A1 | 8/2013 | Holland | |
| 2013/0259446 A1 | 10/2013 | Sathish | |
| 2013/0317944 A1 * | 11/2013 | Huang | G06Q 30/0623 705/26.61 |
| 2014/0074629 A1 | 3/2014 | Rathod | |
| 2014/0129942 A1 | 5/2014 | Rathod | |
| 2015/0052456 A1 | 2/2015 | Engelking | |
| 2015/0088630 A1 | 3/2015 | Taylor | |
| 2015/0088955 A1 | 3/2015 | Hendrick | |
| 2015/0120436 A1 | 4/2015 | Duleba | |
| 2015/0149282 A1 | 5/2015 | Wolfe | |
| 2015/0332029 A1 | 11/2015 | Coxe | |
| 2016/0078177 A1 | 3/2016 | Sugimoto | |
| 2016/0125440 A1 | 5/2016 | Heffernan | |
| 2016/0210598 A1 | 7/2016 | Novick | |
| 2016/0248778 A1 | 8/2016 | Erdal | |
| 2016/0255091 A1 | 9/2016 | Evans | |
| 2017/0124385 A1 * | 5/2017 | Ganong | G06F 16/50 |
| 2017/0127128 A1 * | 5/2017 | Seger | G06F 16/2282 |
| 2017/0147603 A1 | 5/2017 | Bianchi | |
| 2018/0246983 A1 * | 8/2018 | Rathod | G06F 16/9535 |
| 2019/0080155 A1 * | 3/2019 | Ganong | G06K 9/00261 |
| 2020/0145364 A1 | 5/2020 | Wolfe | |

FOREIGN PATENT DOCUMENTS

| | | |
|---|---|---|
| JP | 2009199368 A | 9/2009 |
| JP | 2010527492 A | 8/2010 |
| WO | WO2008144412 A2 | 11/2008 |
| WO | WO2013173395 A2 | 11/2013 |

OTHER PUBLICATIONS

Carlisle, M. (Aug. 29, 2011). "Twitter-OAuth-authentication-using-Net." Located at http://www.codeproject.com/Articles/247336/Carlisle., last visited on Dec. 19, 2013, five pages.

Extended European Search Report (includes Supplementary European Search Report and European Search Opinion) received for European Patent Application No. 13791603.7, dated Mar. 3, 2016, 6 pages.

Extended European Search Report received for European Patent Application No. 19191142.9, dated Dec. 3, 2019, eight pages.

Final Office Action dated Apr. 3, 2020, for U.S. Appl. No. 14/400,723, filed Nov. 12, 2014, nine pages.

Final Office Action dated Oct. 18, 2018, for U.S. Appl. No. 14/400,723, filed Nov. 12, 2014, 13 pages.

Final Office Action dated Oct. 29, 2018, for U.S. Appl. No. 14/400,723, filed Nov. 12, 2014, 11 pages.

Indian Office Action dated Feb. 7, 2020, for Application No. 10366/DELNP/2014, eleven pages.

International Preliminary Report on Patentability received for PCT Patent Application No. PCT/US2013/041032, dated Feb. 19, 2015, 8 pages.

International Search Report dated Jan. 10, 2014, for PCT Application No. PCT/2013/041032, filed Jan. 10, 2014, four pages.

Non-Final Office Action dated Dec. 14, 2017, for U.S. Appl. No. 14/400,723, filed Nov. 12, 2014, 10 pages.

(56) References Cited

OTHER PUBLICATIONS

Non-Final Office Action dated Sep. 19, 2019, for U.S. Appl. No. 14/400,723, filed Nov. 12, 2014, eight pages.
Notice of Allowance dated Feb. 21, 2020, for U.S. Appl. No. 16/734,267, filed Jan. 3, 2020, seven pages.
Notice of Allowance dated Jan. 8, 2020, for U.S. Appl. No. 16/695,032, filed Nov. 25, 2019, seven pages.
Notice of Allowance dated Oct. 3, 2019, for U.S. Appl. No. 16/529,642, filed Aug. 1, 2019, ten pages.
Office Action received for Japanese Patent Application No. 2015-512772, dated Apr. 3, 2018, 4 pages.

* cited by examiner

SOCIAL PLATFORM WITH ENHANCED PRIVACY AND INTEGRATED CUSTOMIZATION FEATURES

CROSS-REFERENCE TO RELATED APPLICATIONS

This application is a continuation of U.S. patent application Ser. No. 16/734,267, filed Jan. 3, 2020 (now U.S. Publication No. 2020/0145364), which is a continuation of U.S. patent application Ser. No. 16/695,032, filed on Nov. 25, 2019 (now U.S. Pat. No. 10,652,199 issued on May 12, 2020), which is a continuation of U.S. patent application Ser. No. 16/529,642, filed on Aug. 1, 2019 (now U.S. Pat. No. 10,491,559 issued on Nov. 26, 2019), which is a continuation of U.S. patent application Ser. No. 14/400,723 (Now U.S. Publication No. 2015-0149282), filed on Nov. 12, 2014, which is a U.S. national phase of PCT Application No. PCT/US2013/041032 filed on May 14, 2013, which claims the benefit of U.S. Provisional Application No. 61/646,736 filed on May 14, 2012, the disclosures of which are incorporated in their entirety by reference herein.

FIELD OF THE INVENTION

The present invention relates to computer networks, and more particularly systems and methods related to social networking with enhanced control over privacy and customization based on user preference.

BACKGROUND

Conventional social networks (such as Facebook® and LinkedIn®) provide a variety of features, sometimes free of charge and often on a "freemium" model, to attract users to their site, but almost all of the social network platform providers retain a level of control on user content which may compromise a user's privacy. In an attempt to commercially monetize data extracted from the user's interaction on their sites, the platform providers make the data available to advertisement services/retailers/wholesalers. Currently, users almost have no choice to enjoy the social networking experience without having to endure undesirable exposure to advertisement and/or breach of privacy, resulting in a lot of potential users avoiding social networking altogether. This shortcoming may actually hurt businesses who would want to reach out to potential customers in a meaningful way where the user's attention is not diluted by an overwhelming amount of un-curated data.

Furthermore, a user has to log on separately to various social networks to interact on a particular platform with a particular group of people. Often, user has no flexibility in aggregating contents from various networks as personal bookmarking/archival. The users are also not empowered to create 'groups' according to their preference to enjoy focused and perhaps higher-quality interaction within a group with a level of privacy that the user is comfortable with.

To address many of the shortcomings discussed above, what is needed is a social networking platform with customizable level of privacy and enhanced features to empower the users to control the flow of data that they share. In many aspects, what is needed is an antidote to the conventional social networking experience.

SUMMARY OF THE INVENTION

Embodiments of the present invention a social networking platform offering various services, including, but not limited to: facilitating aggregation and management of a user's interaction on one or more social networking platforms, offering enhanced control over the level of privacy associated with the flow of user data, offering tools to customize the user's exposure to advertisement-related content on the social networking platform(s), integrating features to control aspects of how data/content is presented to and visualized by the user, empowering the user to multicast direct messages to other users without the other users having to meet certain constraints, empowering the user to create and/or join a group based on messaging threads, and the like. One or more of these enhanced services/features are associated with a powerful framework of authentication/permission model for access control. Therefore, the platform can be inherently made safe for certain demographics (e.g., minors) by design. The platform also can also be made to serve businesses/enterprises by empowering nuanced levels of access to individual employees.

It is to be noted that the words 'user' and 'member' has sometimes been used interchangeably in the specification. However, the word 'user' has mostly been used to describe individuals who interact on the social network platform of the present invention, irrespective of whether they are part of a group or not. When a 'user' becomes part of a group, s/he is frequently described as a 'member.' Also, the term 'group' does not necessarily mean a formalized group. The word 'group' encompasses a collection of people who may be deemed as a part of an existing or potential group. In other words, a group can be an ad hoc group within the social networking platform of the present invention.

The social networking platform is available to be accessed via various computing/electronic devices, such as a desktop computer, a laptop computer, a mobile smartphone, a tablet computer, a set-top box connected to a television set, a personal computer for media (media PC), a gaming console etc. It may be available to be integrated with other smart mobile devices, such as, a positioning/navigational device, a health management device, a portable gaming/entertainment device, a wearable electronic device etc.

The social networking platform of the present invention can be a public platform, a semi-private platform, or a private platform. The level of privacy may be customizable according to member preference.

According to certain aspects of the invention, a method of implementing a multi-network interaction is implemented, where the method comprises: identifying a plurality of users to form a group within the first social network; enabling members of the group to connect to a second social network from within the first social network, wherein the second social network is external to the first social network; enabling members of the group to access contents posted by at least some of the other members of the group to the second social network; and, displaying, within the first social network, contents posted by the members of the group to the second social network. The members of the group who are connected within the first social network do not have to be connected with one another on the second social network.

According to certain other aspects, a computer-implemented method for dynamically creating a formalized group on a social network platform, the method comprising: enabling users to directly exchange messages within the social network with one or more other users of the social network; storing a thread of messages between the users of the social network; providing at least one of the users an ability to formally create a group as an initial group owner within the social network based on the stored thread of messages; and, providing the ability to one or more members of the formalized group to manage aspects of the formalized group.

According to yet additional aspects, a computer-implemented method of presenting multi-format information to a user of a social networking platform, the method comprising: enabling the user to control the relative proportion of various formats of information embedded within a stream of information being visualized by the user within the social network platform.

According to additional aspects, a computer-implemented method of globally associating identification indicia in the form of a universal tag wherein the universal tag spans across different service types and different information types available within the social network, the method comprising for an individual member and/or for members of formalized groups within the social network to sort, organize, or otherwise categorize items using the universal tag within several distinct formats of services and information which may include text posts, graphics, photos, video clips, calendar events, contact information, documents, and other media; and, archiving the universal tag and its associated content in a database of the social network The universal tag spans across a plurality of groups within the social network.

According to additional aspects of the present invention, a computer-implemented method of serving advertisements to a user within a social network platform, wherein the user's personal identification information is anonymized, the method comprising: providing an interface on the social network platform for the user to enter information specific to the user's advertisement viewing preference, thereby setting up an advertisement filter, and, anonymizing the user's personal identification information from the provider of the social network platform; and, placing a proxy server or other anonymization method between an advertisement provider and the social network platform server, wherein the proxy server blocks access to user's personal identification information by the advertisement provider, and, selectively presents the advertisements to the user that are passed through the advertisement filter based on the user's advertisement viewing preference.

Coupons are placed within the social network based on the user's advertisement viewing preference. In the context of the present application, "coupons" are considered to be encompassed by the broad term of "advertisement."

According to certain aspects, embodiments of the invention provide an all-in-one dashboard that offers user groups, social network aggregation and free personal cloud storage, and much more. The user groups can be private/semi-private/public. Embodiments of the invention are designed for those who are overwhelmed by their many social networks as well as those concerned about how their online activities and personal information are tracked, stored and shared. The invention's Privacy Bill of Rights, transparent privacy policy and permission tool "GroupAuthTM," provide an augmented level of privacy assurances for users.

According to certain additional aspects, an embodiment of the invention is a web and mobile based application that allows users to upload and manage their digital content, and also to control how their content is shared with others in their social networks, via email, and in private group environments that they can create or be invited into. Many aspects of the service are novel and specific to the platform of the present invention, while certain other aspects of the service are customized to be facilitate/harness user's interaction on other social networking platforms by providing seamless integration with the other social networking platforms.

In a user's private group environment, in addition to sharing their own content, they can also receive content from other group members who have enabled them to see it, and "re-share" it with others. The whole system is built on a powerful permissions and sharing model that gives the owner of a piece of content the ability to selectively share it with individuals or groups of members, and to control the permissions that those viewers of the content have. This complex permission and sharing model is woven into all of the various services in the application, including "What's New" text posts, Photos, Videos, Calendar Events, Documents, Direct Messages, and much more. Additionally, the user has his own personal document storage area sometimes called the "My Cloud" area which serves as a general repository and permissions manager for all the content they own, of whatever type. From My Cloud, the user may choose to share their content with others, to revoke the sharing of their content that they have previously shared, to change what they allow others to do with their content, to download it from the site, and if they wish, delete it entirely. Users may also receive content from and share content to external social networks that are accessible from within the social platform environment.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, which describe various implementation examples of embodiments of the invention in a service accessed by a browser application on any known or future computing device. Those skilled in the art will understand how to implement the invention after being taught by the foregoing descriptions and drawings.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, embodiments of the invention provide a number of different features and advantages that advance the state of the art of computer-networking-based social sharing. These features and advantages are provided via a combination of one or more services, implemented in software and appropriate hardware interface to execute the software, while honoring users' preferred level of privacy in regard to content ownership and advertisement-related interactions on the social platform.

Example aspects of these and other features and advantages will be described in more detail below. These descriptions will refer to an example platform referred to herein as "Sgrouples," in which all of the above services and features are integrated. However, the invention is not limited to this particular example platform and/or combination of services and features, as will be appreciated by those skilled in the art after being taught by the following examples.

Figure 1:
FIG. 1 illustrates a welcome screen for a social network, according to one embodiment of the present invention.

FIG. 1 shows an illustration of a welcome page for the example social networking platform of the present invention Sgrouples. This page shows some of the features and services offered by the platform, which are laid out as the 'tabs' listed horizontally (e.g., "Groups", "What's New", "My Cloud" etc.) at the top and also, on the left panel of the webpage (e.g., "Create New Groups", "Social Networks" etc.

Figure 2:
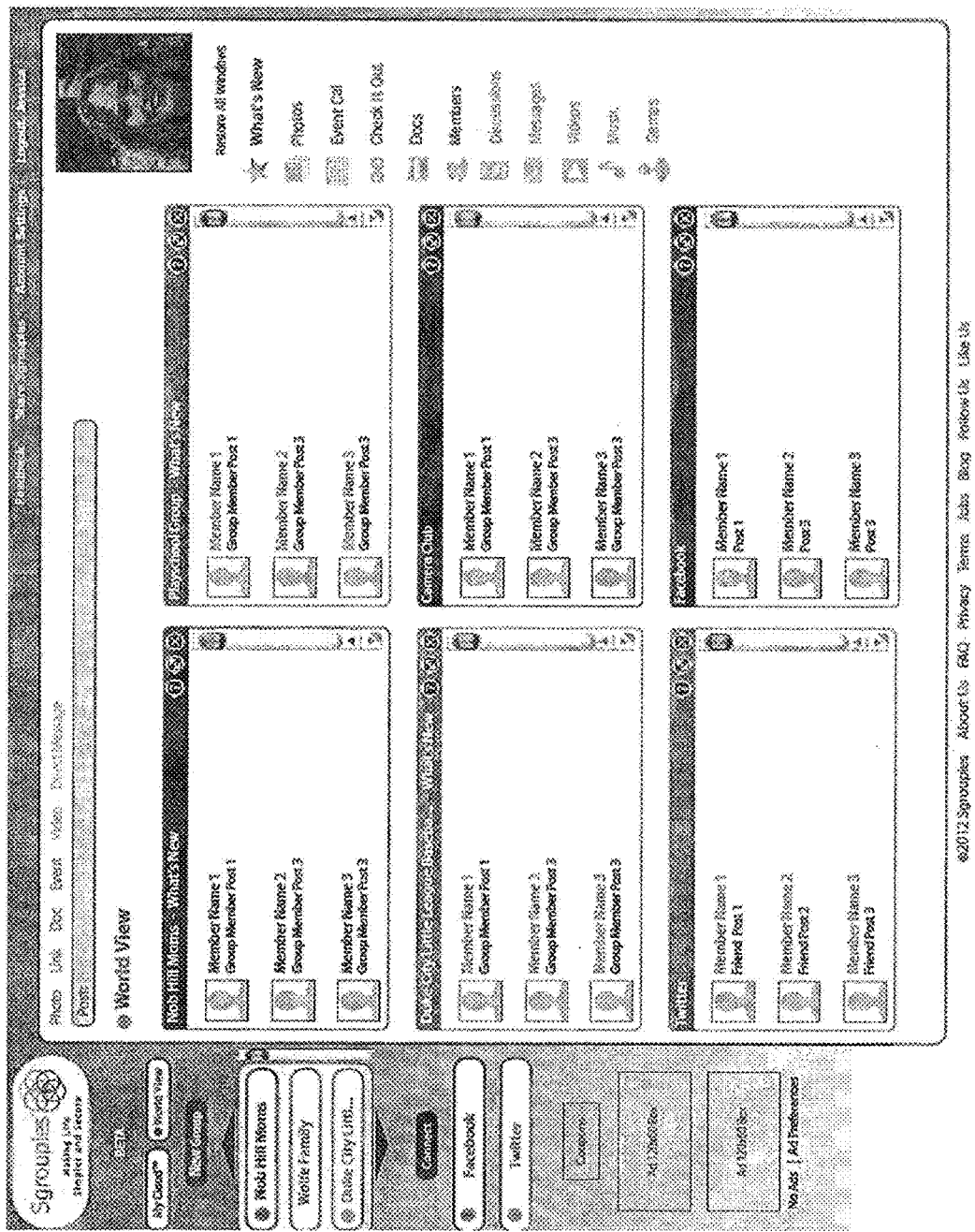
FIG. 2 illustrates a page view within the general environment of the social network platform of the present invention, showing user groups an gateways to external networks.

FIG. 2 shows the another example of how a page within the general environment of the social platform of the present invention may look like, once a user has created groups and/or entered data to indicate their preference. This view is known as "World View" within the example social network Sgrouples. Users can select which contents are displayed at what level of priority on a specific page. This example page shows a collection of panels each showing various groups that the user is interested in (such as Playschool group, Camera Club, etc.) and also gateways to other social networking sites (such as Facebook, Twitter etc.) Note that users can selectively post content to a group/remove content posted to a group/change permission level of who sees the content, but still maintain the content in his/her personal storage space. The personal storage space is sometimes referred to as "My Cloud," also shown in FIG. 2 in the left hand panel.

As a pivotal feature of the social networking platform of the present invention, user has the ability to create/join a group based on a variety of criteria of interest to the user, such as certain themes, certain types of content, appropriateness of the content for certain demographics, existing and/or potential members of the group etc.

As an easy visual cue to associate relevant content/activities to a particular group, a special distinctive color may be chosen, from a color palette provided to the user by the platform provider. For example, on FIG. 2, the distinctive color of choice for the group "Camera Club" is purple. So the member names are all shown in that color, and the page pertaining to that group predominantly use the color purple, for example in tagging the content, framing/highlighting a content etc.

Figure 3:
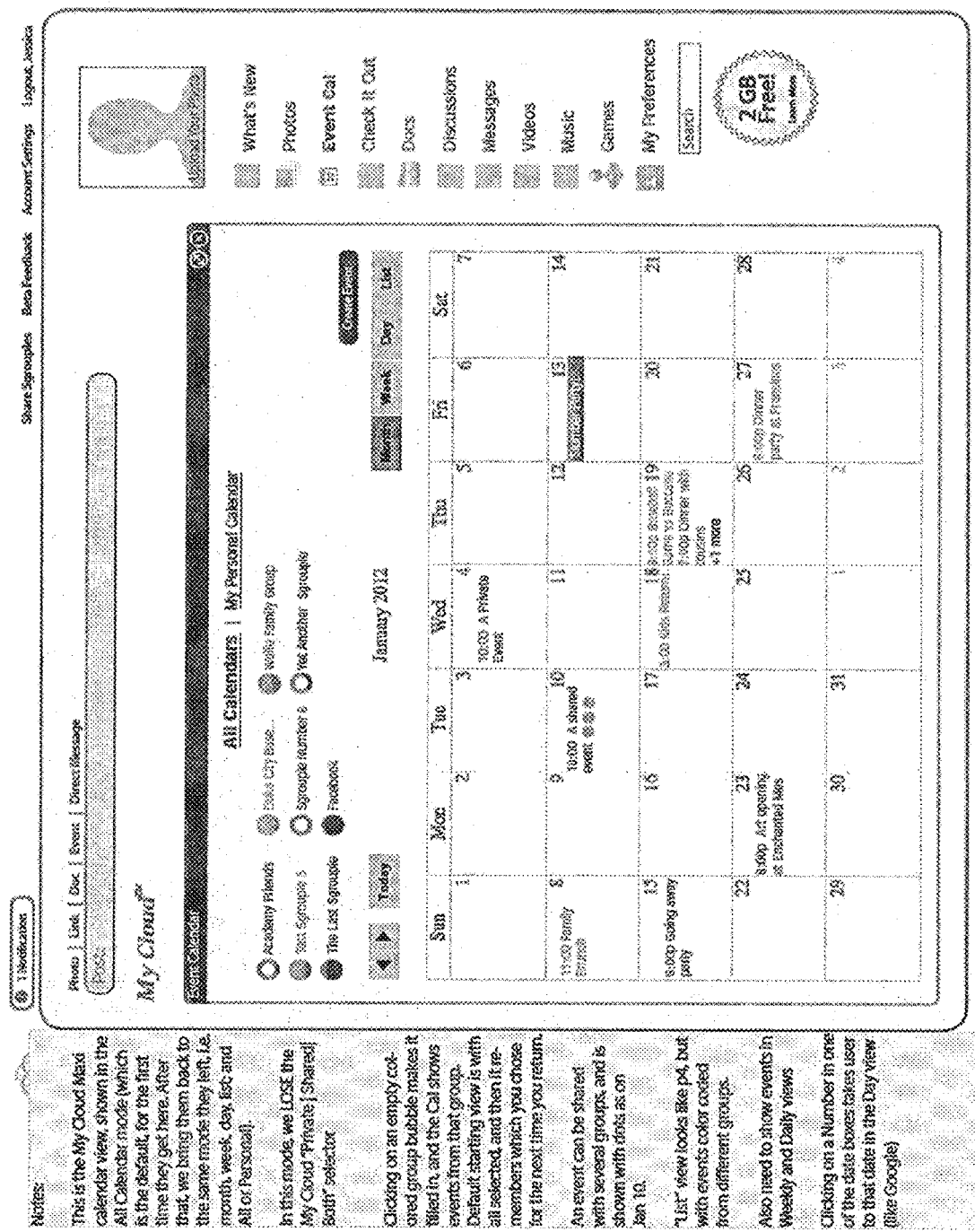
FIG. 3 illustrates a custom view of an integrated calendar for an individual user belonging to multiple groups within the social network of the present invention.

For integrated view presented to an user, where data related to different groups that the user is a member of are all shown on a single screen, the color distinction offers ease of data visualization/interpretation. For example, in FIG. 3, a calendar view is shown where different calendar entries are framed with a corresponding color of the group to which the entry pertains.

Contents on the social networking platform may be tagged by one or more users, who may or may not be the original owner of the content based on the set permission level. For example, any member with posting permission may tag other members of a group in a picture. Members of a group may also tag items, and the tags may be globally searchable within a group. In one example, tags may reflect characteristic of a group, such as a pre-assigned color for a group may be reflected in the tag. By designing the proper level of permission control, tagging may be disabled for users who may be within the social networking platform, but are not necessarily part of a particular group where the content is posted. Removal of tag can be the privilege of the owner of the content, the group owner/moderator, or the tagged person. When a group member tags another member of the group, an appropriate notification is sent to the member who is being tagged. The tagging and universal tagging features are elaborated later in the specification.

The contents shared/tagged within the social networking platform of the present invention may be suitable for lightweight communication or content-rich communication. For example, graphics and audio-visual clips may be embedded in a posting. Photo albums may be created from posted/shared photographs. Photo albums bay be used as a source of images to create a collage with photos of various aspect ratios within an outline. Other related options, for example, printing options may be integrated with the album or the collage. When graphical content, e.g., an album or a photo/collage, is shared with a group, a notification may be received by all members of the group at the "What's new" panel of the screen. Content can be shared from "My Cloud" to one or more email addresses or phone numbers too instead of or in addition to being shared on the group page.

Embodiments of the invention provide a unique suite of privacy protections that it calls its privacy bill of rights. The privacy protections are enforced through the technological design, and are what is called "privacy by design."

A user's personal information is private and it is theirs rather than the social platform provider's. Users own their content and all of their data, and share according to their level of comfort with privacy issues. Users are in control of who can see information about them and posted by them. The social platform provider will by default refrain from making user data being available for searching, advertisement placement etc. unless the user wants that. The platform provider typically will not suggest contacts, friends, or "people you might know", to users. Permissions and privacy are considered as user rights. Embodiments of the invention make it easy for users to deny or give access to any content they create. Embodiments of the invention ensure tracking, profiling, sharing of personal information are disabled without specific content from the user. Furthermore, users decide the type of advertisements they want and the social platform provider will cater to the user's preference. Users will also have a "No Ads" option. If a user leaves the social platform providers' service, there are clear and easy instructions on how to delete anything and everything of that user at the platform if they desire.

With an overarching principle of customizable privacy settings defining user experience, the social networking platform of the present invention does offer certain enhanced communication and sharing features that are elaborated in greater detail below. Persons skilled in the art will appreciate Integration with Other Social Network Platforms In one embodiment of the present invention, a user enjoys the ability to interact with multiple other users at once without the multiple other users having to individually meet certain constraints, such as individually being members of a social network external to the social networking platform of the present invention. As an example, let us assume that at least sonic of the multiple other users are using a second social networking platform, such as Twitter, which is separate from and external to the social networking platform of the present invention. Twitter is a popular lightweight communication platform that allows users to follow other people and view what those people are posting. Twitter users can follow large numbers of users, and some Twitter users are followed by many people. Because of the large number of posts that flow through Twitter, users often fail to see the posts by the people they particularly are interested in following. Furthermore, Twitter itself lacks the ability to communicate in groups, and it lacks the ability to share and archive data of various types, including documents and calendar events. Virtually all Twitter functions are public, with the exception of a private Direct Message function, but it only enables users to communicate privately to one member at a time, and does not support multiple-person messaging.

To address these shortcomings, the social networking platform of the present invention provides a service, referred here as "Group Tweets," that allows users (who may be members of a group) to see one another's Twitter posts, without having to follow those people on Twitter itself. Persons skilled in the art will understand that though Twitter is being used as an illustrative example, the scope of the invention encompasses other social networking platforms too, such as Facebook, My Space, LinkedIn etc., and the term 'tweet' is being used in a somewhat generic sense to include the form of posting. This service can be used by groups of people who share common interests and desire a more powerful and private communication platform not subject to the constraints of Twitter. By offering the Group Tweets service to users of the social platform of the present invention, the effect is to create a deeper sense of community among that group of users inside the platform, who then also have access to more powerful social sharing tools, such as photo albums, document sharing and collaboration, event calendars, and multi-person direct messaging.

The Group Tweets feature differs fundamentally from existing Twitter lists because Twitter users can not add a set of people at once to create a private/semi private group. The groups within the social platform of the present invention have customizable privacy levels, and users can join by invitation. Although Twitter lists come in "Public" and "Private" varieties, this distinction only determines if the world at large can see the list, or if only the creator can see the list. There is no ability for a selected group of people to share that list. Furthermore, the Twitter list has no actual connection between the members of the list, each of whom has no control over being in a given list. By contrast, members of a group on the social platform of the present invention are invited to join the group, and they can leave the group at any time. The Group Tweets service provides a mechanism to create a carefully curated list of Twitter users who all are members of the group. In addition to seeing one another's Twitter posts, these group members can also share and archive rich content not available via Twitter, including documents, events, calendars etc. The individual group members are also able to directly and/or privately message the entire group or subsets of it. This service can potentially be extended to users of the social networking platform in general who are not necessarily members of a formal group yet.

From an 'user experience' standpoint, a non-limiting illustrative flow can be as follows (using Sgrouples as the example social networking private embodying the present invention): 1) A user registers at Sgrouples; 2) The user creates a private group and invites others to join; 3) Invited users register/login at Sgrouples and join the group; 4) One or more of the users also connect to Twitter from within the Sgrouples environment. The Group Tweets service is only displayed in the menu inside the group (for example in the horizontal menu, or elsewhere inside the group) when at least one member of the group is connected to Twitter. 5) When the service is active, it displays (in chronological order or based on other prioritization criteria) all the tweets posted to Twitter by members of the current group who are connected to Twitter, whether or not the other members of the group follow them, or even are connected to Twitter themselves. 6) If one or more of the group members don't want to see Group Tweets, there is an optional field in the group preferences allowing the member to disable the 'Group Tweets' feature in that user's view of the group activities, or the feature can be disabled for the whole group based on group consent.

The platform of the present invention provides, among other things, means to archive the content posted to Twitter by a group of people who may not be mutually connected via the Twitter service; means for users/group members to view the content posted to Twitter by members of their group who may not be mutually connected via the Twitter service; means to provide a group of Twitter users with additional social sharing tools, including archived photos, events and documents; means to provide a group of Twitter users with the ability to send direct messages to more than one recipient in the group.

Technically, this service can be implemented in several ways. In one example way, we identify the Twitter IDs of each member in the group (this can be a group prior to formalization, i.e. can be an ad hoc group) who is also a Twitter member, then query the Twitter service through its public 'User Streams' API, requesting the content associated with each identified Twitter user, then store those tweets in the database of the social platform of the present invention, such as Sgrouples database. In this implementation, the Group Tweets service then loads past set(s) of group tweets without having to re-query the Twitter service. In this way, when another group member accesses the Group Tweets service, the data is already stored in the Sgrouples database and doesn't have to be reloaded from Twitter. This solution saves load-time and minimizes the requests to the Twitter service. Another way to implement Group Tweets is to re-query the Twitter service every time any member accesses Group Tweets. This solution provides the freshest and most complete data set, but is slower and requires the most requests to the Twitter servers. An intermediate solution can also be implemented, where the number of queries sent to the Twitter server is limited within a specific period of time.

Group Tweets is built around Twitter API's using OAuth, HTTP and JSON technologies to gather data. There are three main Twitter API's used: REST API v1.1, User Streams and Site Streams. User must first authenticate Sgrouples as a trusted application with Twitter using OAuth algorithm.

After authenticating successfully with Twitter, two API's are used simultaneously. First, the REST API is used to download user data and display the Twitter feed. At the same time, "User Stream" API is launched to start listening for tweets from Twitter asynchronously. After User Stream is launched all tweets from the followed accounts are asynchronously pushed to Sgrouples servers and stored in database to be used in Group Tweet functionality later.

With the addition of a third Twitter API "Site Streams," users are able to see real-time updates from other group members in Group Tweets, which is not possible with the User Stream API alone. Using the Site Stream API also allows the Group Tweets service to listen for Twitter data asynchronously even when the initiating user goes offline.

Figure 4:
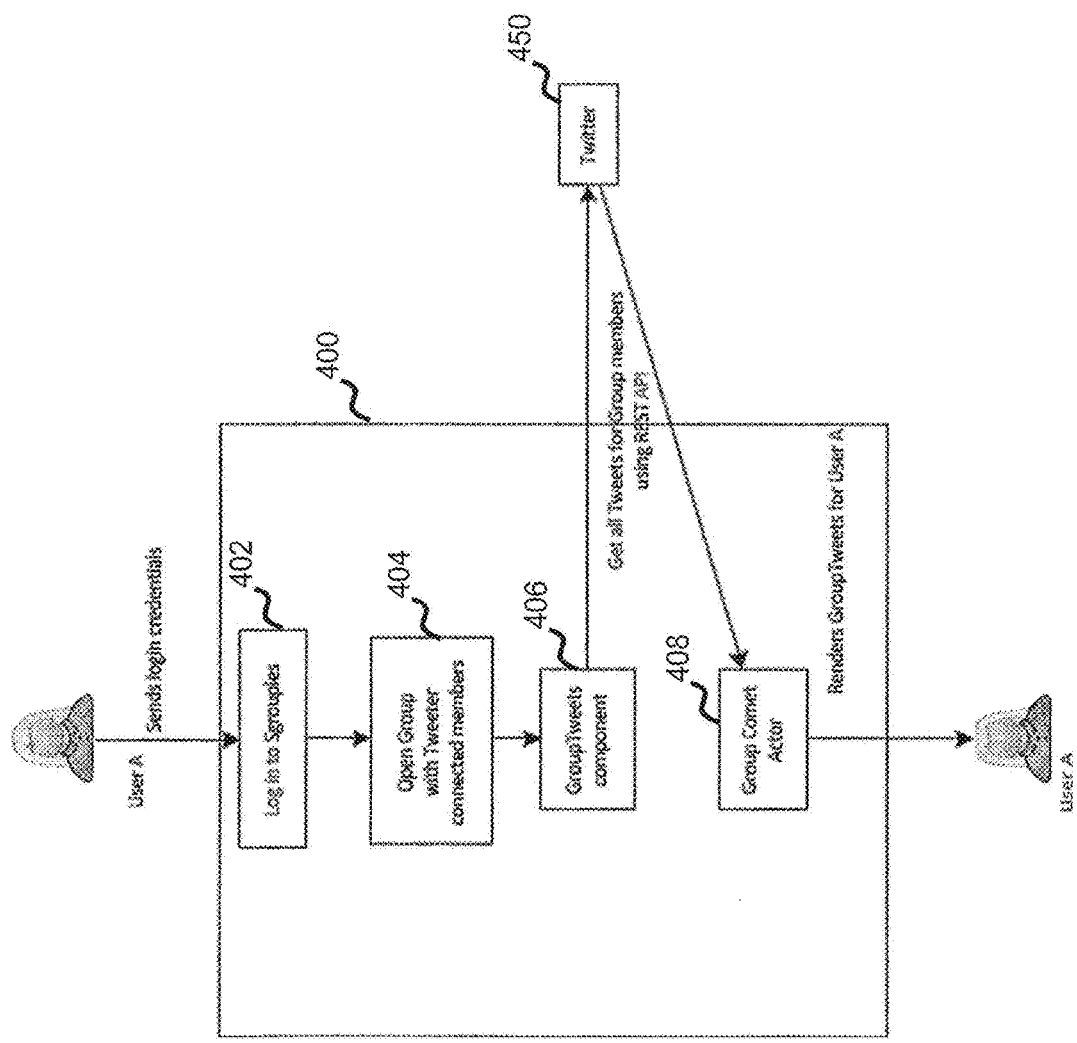
FIGS. 4 and 5 illustrate process flowcharts for a feature described as "Group Tweet", according to embodiments of the present invention.
Figure 5:
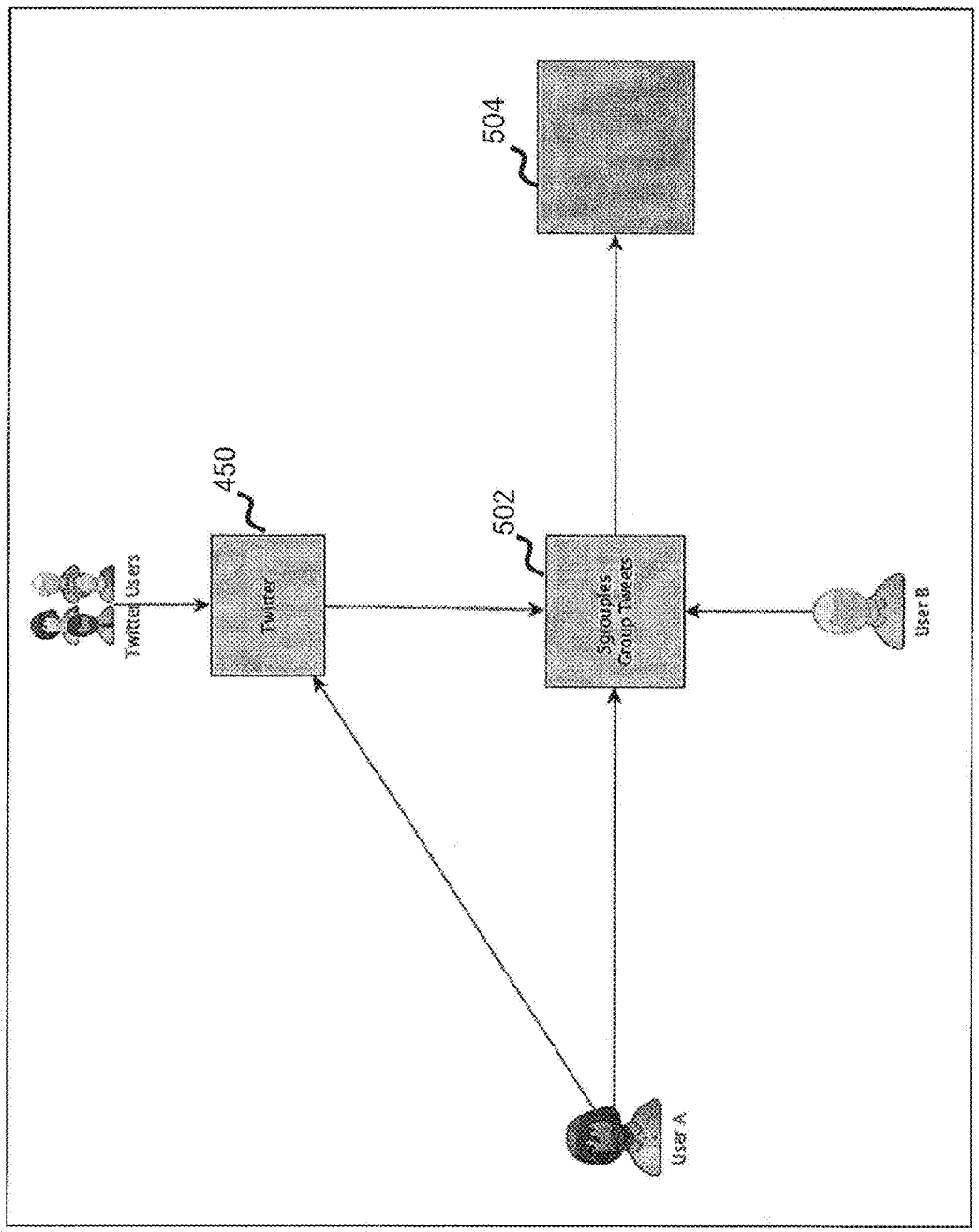

FIG. 4 shows an example situation, where user A logs in to Sgrouples in step 402 (the Sgrouples environment is shown as element 400). User A creates a group with Twitter connected members in step 404. Through the Group Tweet feature (element 406), the twitter postings of the group members are displayed in Sgrouples. Twitter is shown as the external network 450. The Group Comet Actor 408 in the Groups Tweets service is an entity that exists outside the standard http request cycle that allows for asynchronous communication from the server to the members of the group, such that the information they receive is automatically updated without requiring a manual request. FIG. 5 shows a further implementation of the Group Tweet service where a local database 504 (such as a MongoDB) coupled to Sgrouples archive Sgrouples group tweets 502. Here user A is a Twitter member as well as Sgrouples member, but user B is not a Twitter member, just a Sgrouples group member, but can still can see tweets from Twitter users who are also Sgrouples group members.

Persons skilled in the art will appreciate that though specifically not disclosed here, the social platform provider possesses copyrighted data model and rendering code, streaming API implementation code, service load code (e.g. code to load Twitter service from within Sgrouples platform) etc.

Direct Messaging and Group Creation

Users of the social networking platform of the present invention have the option to send direct messages (DM) to other users. The message exchange does not necessarily have to be between members of a formalized group. In other words, the platform offers message exchange between an ad hoc collection of users who may eventually formalize a group. As a special feature, the platform can provide a mechanism to create a group (ad hoc or formalized) by storing a thread of exchanged messages between the users of the social network.

The Direct Messaging feature can be accessed in several ways, including, but not limited to: from the "Direct Message" link in the posting bar; from the "New Message" link inside the Direct Message Service; from the standard Post or Share dialog, when users select "Individual Members" as a destination; from a Member's Page, by clicking the "Send a Direct Message" link, etc.

The messages a member sends and receives are stored on the Message Area. Messages may be sorted/grouped by conversation, with the most recently exchanged conversation at the top. When the user clicks one of the messages in the main messages area, the detailed view of the conversation opens, and they see a collection of messages back and forth, with the oldest at the top, and the newest at the bottom. Below the most recent message is a Reply function, allowing the user to add to the conversation.

Each message may have text as well as inline images, does, and active links, video clips, sound files, calendar events or other formats of information. The user can add a photo or doe (or other file) in a reply, or they can start a new conversation by sharing a photo or doe with a member as a direct message. Photos may be shown in the message stream at thumbnail format, and they can be clicked on and seen at large resolution in a fancybox format (without comments). From the Message area, a user may start a direct message and add multiple recipients. The recipients may be part of a single group or different groups, or may be individual users of the social networking platform. An auto-complete function may suggest names of members from various groups, color-coded with their group colors.

Once a user starts a conversation thread, an additional option becomes available to create a group. For example of message like may appear: "Enjoying this conversation? Start a Sgrouple (private group) with these members." In other words, the platform provides tools for group creation from message/conversation threads.

Clicking on the Start a Sgrouple (private group) link pops up a dialog allowing the person who clicks the link to start a new Sgrouple (private group). They get to choose the name, color, etc, and they become the owner of the group. Ownership and management of the group can start with one user, can be a shared responsibility, and/or can be delegated. Once a group is created, the other recipients (in addition to the initial group creator) receive a notification onsite and/or by email, allowing them to join the new group. They also see in the direct message thread a note, e.g., "Jessica formed a new Sgrouple (private group) from this conversation" and a button to Join the Sgrouple (private group).

The group may be created by importing a communication exchange thread from an external social network (for example a Twitter feed); and, integrating the imported communication exchange thread within the social network platform.

Figure 6:
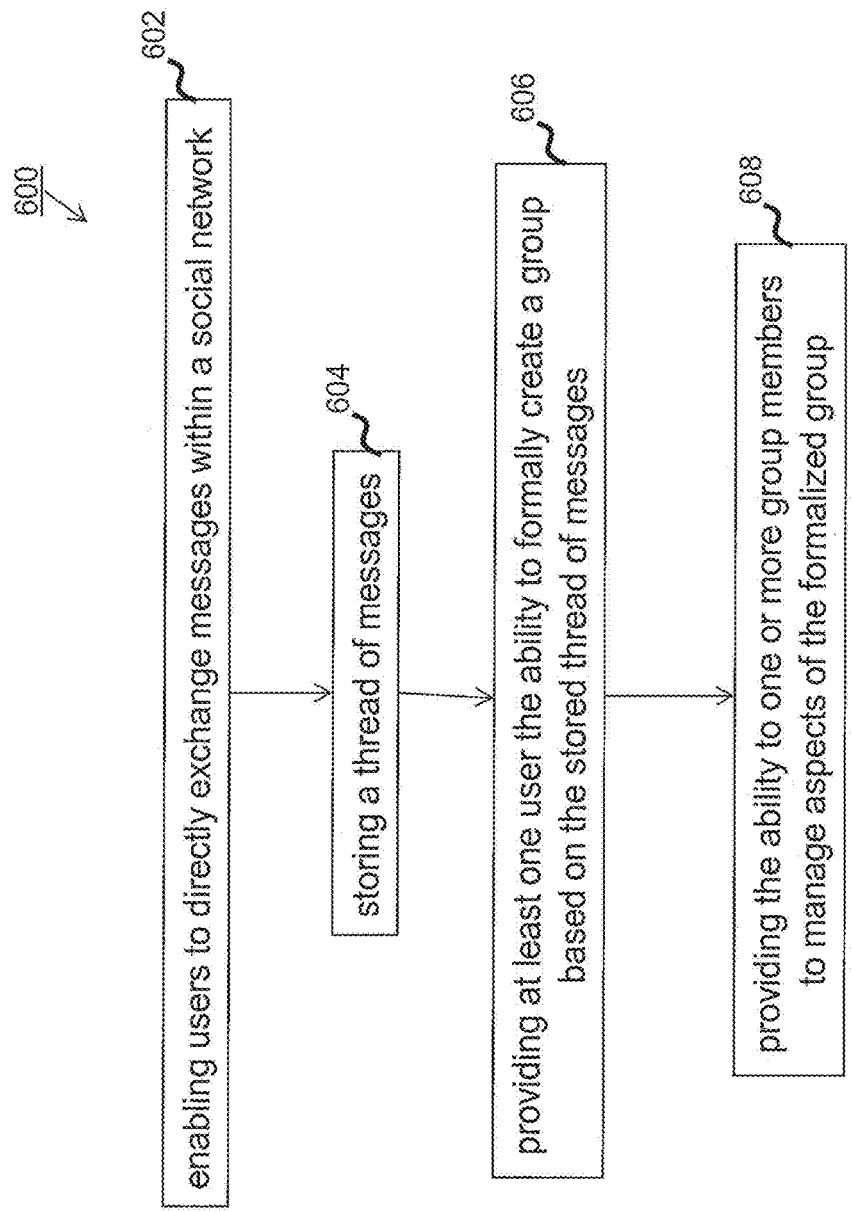
FIG. 6 illustrates an example process flow for creation of a forma group from direct message threads, according to embodiments of the present invention.
Figure 7:
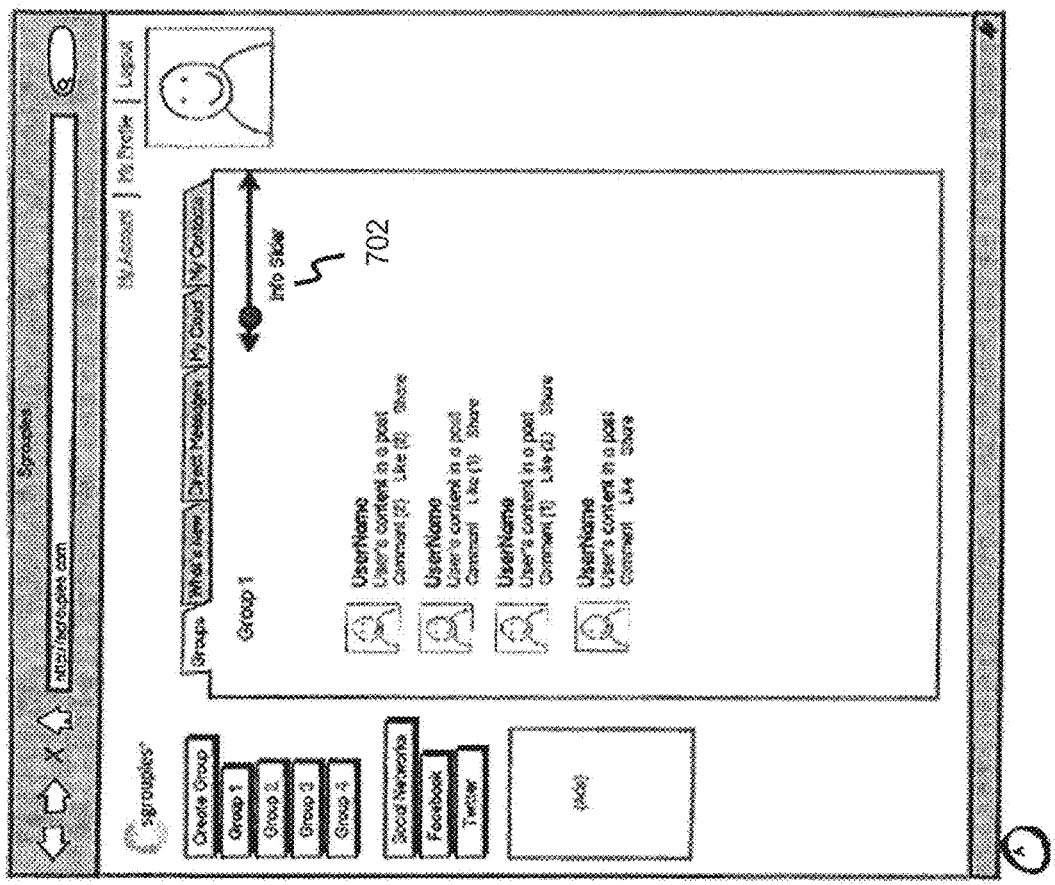
FIGS. 7-10 illustrate wireframe views depicting how an information density slider works, according to embodiments of the present invention.
Figure 8:
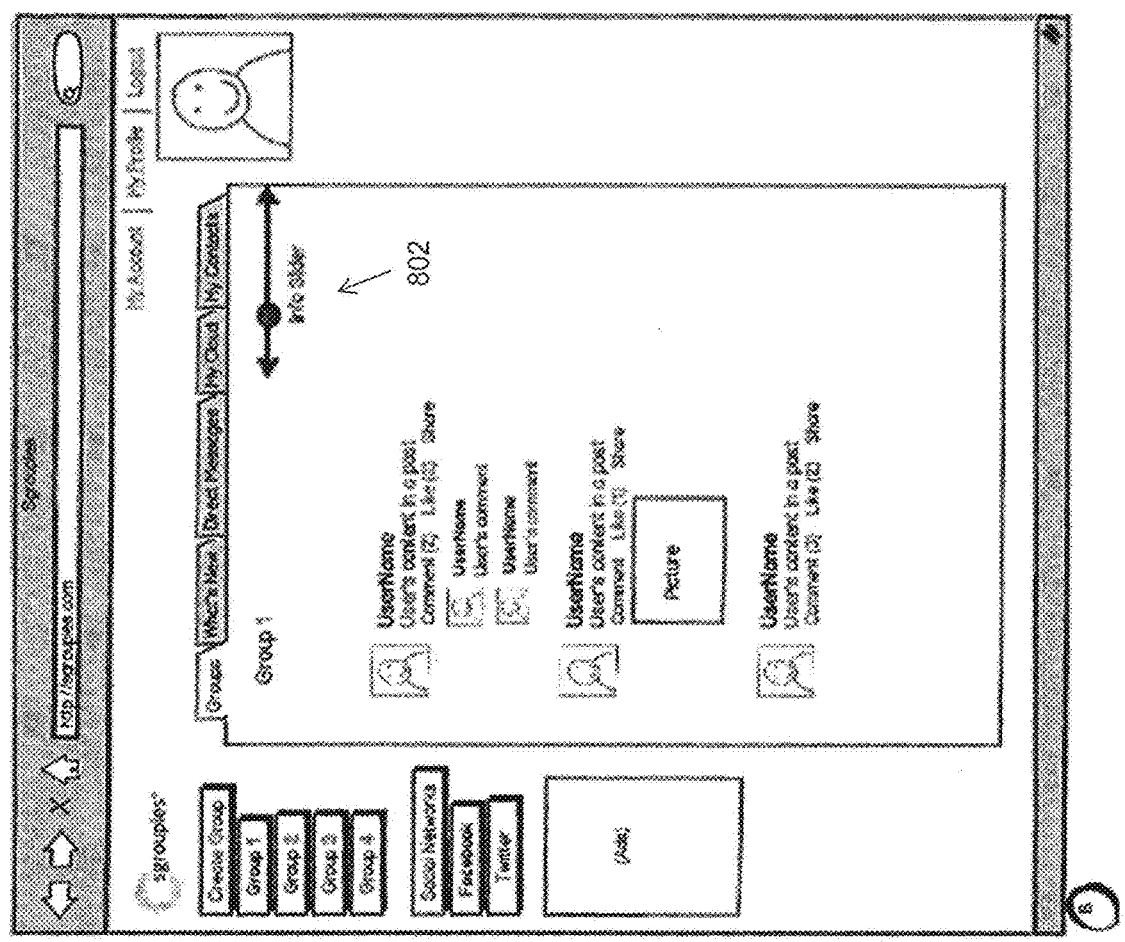
Figure 9:
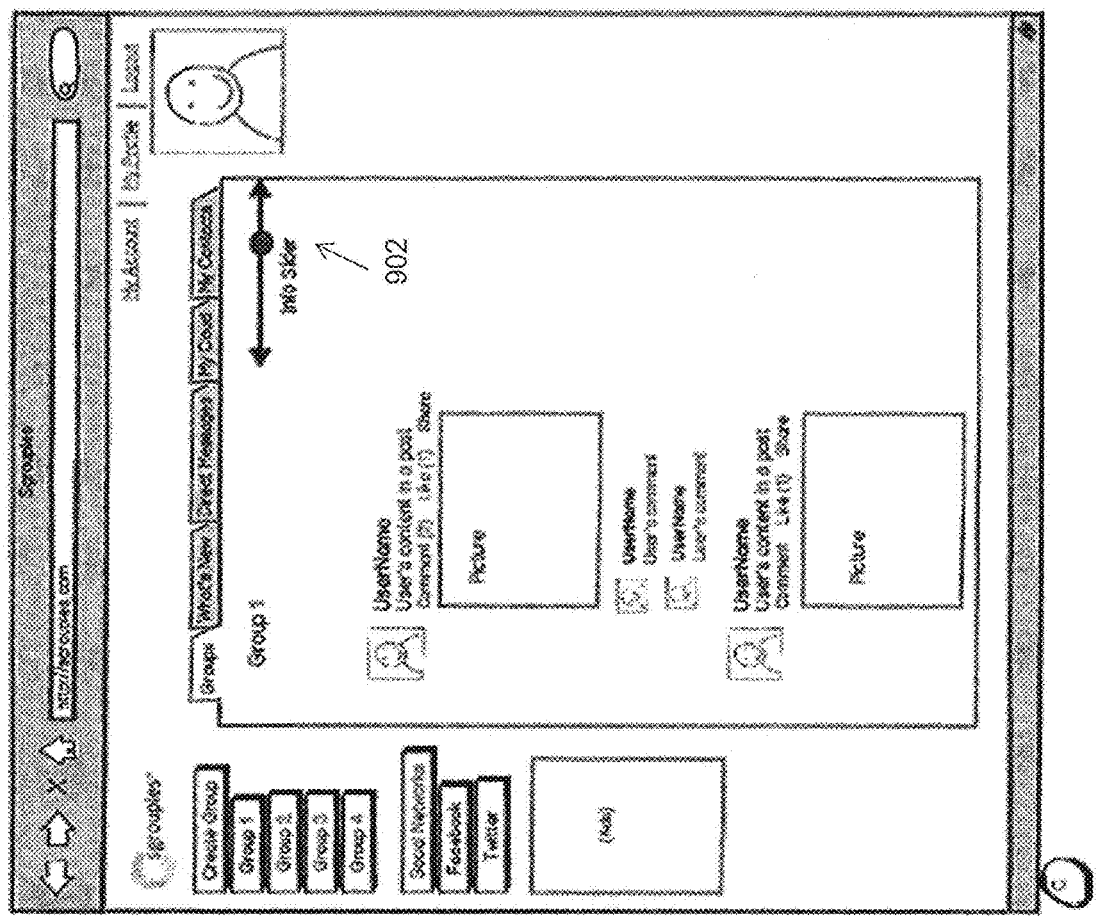
Figure 10:
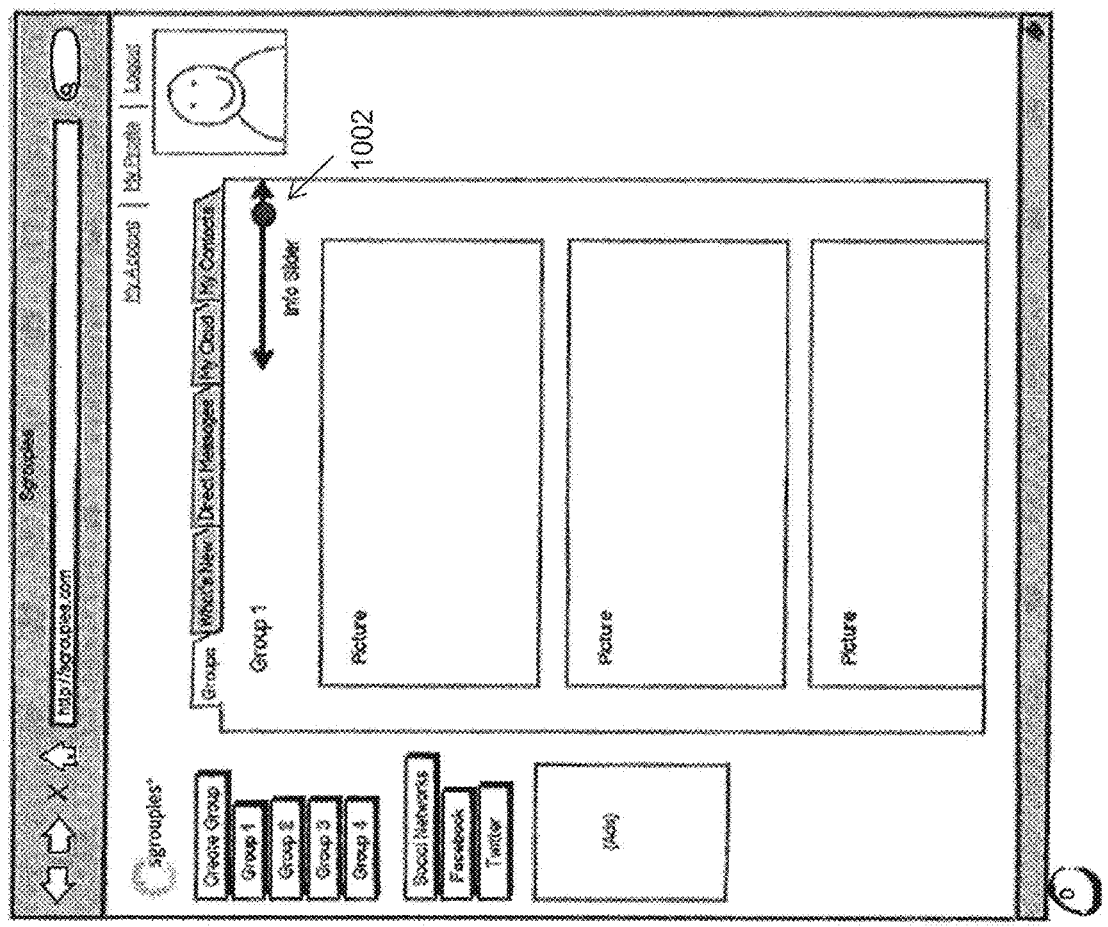

FIG. 6 shows a flowchart 600, which shows the example primary steps, 602 (enabling users to directly exchange messages within the social network), 604 (storing a thread of messages), 606 (providing at least one user to formally create a group based on the stored thread of messages), and 608 (providing the ability to one or more group members to manage aspects of the formalized group).

Information Visualization

The social networking platform of the present invention provides users a great deal of flexibility in terms of how they want to visualize data. Specifically, the social networking platform can present multi-format information to a user based on user's visualization/browsing/information-absorption preference, because the platform provider recognizes that different users process information differently, and also, different formats of contents are displayed differently at different aspect ratios of the visualization device's screen. In short, the platform has features that enable the user to control the relative proportion of various formats of information embedded within a stream of information being visualized by the user within the social network platform.

As an illustrative example, in the "What's New" feed in a user's "My Cloud", in any of their groups, and in any external social media feed (e.g. Facebook, Twitter, Linked In, etc), the user typically sees a chronological aggregation of postings having various types of contents that the user has permission to see. As mentioned above, different people process information differently (e.g., some prefer a lot of text, and some prefer a lot of images), and different devices (ranging from the smallest mobile device to the largest desktop computer) are best suited to display different amounts of data. Also, different groups/group members/users share different types/formats of information.

To accommodate these differences, the social networking platform provides a feature by which the user can adjust the density of the data in his feed via a slider or similar graphic user interface (GUI) mechanism (e.g. knob, switch, buttons, etc). This mechanism controls the visual layout of the data stream, and how much graphic information is presented, versus how much textual information. On one end of the range of possible values is "All Text", which is the highest text data density, and the data stream includes no images. At the other end of the range, the user can select "All Images", in which case they do not see any content items that do not have a graphical component—the stream is literally all pictures with no text. The user may dynamically change the setting of the slider while browsing a data stream. Also, with this feature, the user may control how much contextual information they want to see. In an example, clicking or hovering over the images may trigger appearance of hidden information associated with each picture, such as its owner, caption, comments, date, etc.

There may be a range of intermediate values on the slider that the user may select, which provide a customized balance of text to images. In addition to the ratio of images to text, the scale of the images can also vary, from nonexistent to small to maximal for the device display at the extremes. The setting of the information slider may also change the amount of text displayed, for example truncating what is displayed and providing the user the ability to click to see more, or hiding and showing comments associated with each post.

This mechanism can be set by each individual user in each of their groups. The site keeps track of the user's settings of the Data Density Slider for each of the user's groups and feeds across sessions. The information slider setting can also be set globally for all of a user's groups and feeds. The owner or creator of the group may also customize the information slider settings based on how they wish the group to appear and the specific nature of the information shared within the group, and this setting may define the appearance of the group, or serve as a customizable default setting for each user in the group.

FIGS. 7-10 show the slider moving from one and to the other end (locations shown as 702, 802, 902 and 1002), and the proportion of graphics with respect to text is increasing as the slider moves towards the right.

Figure 11:
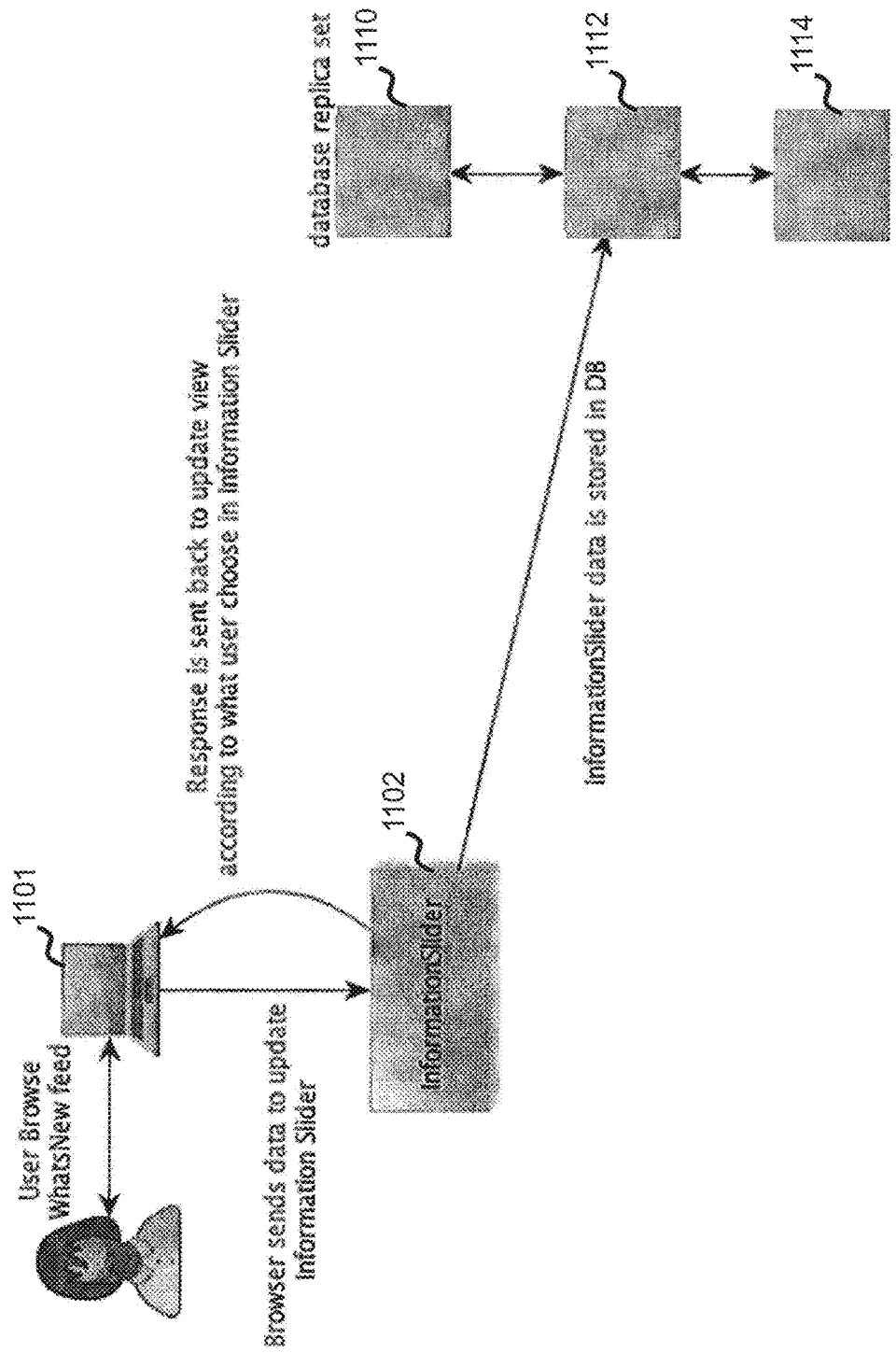
FIG. 11 illustrates a system implementing an information density slider, according to embodiments of the present invention.

FIG. 11 shows the information slider 1102 as a service available to the user who browses a "What's new" feed in the computer 1101. Information slider data is stored in local database coupled to the social network platform provider. Database may comprise multiple replicas, as shown in FIGS. 11 (1110, 1112, and 1114).

Advertisement Model within Social Networking Platform

The social networking platform of the present invention integrates an advertisement model within the platform with user privacy at the core of its philosophy. To that cause, the platform provider may choose to concentrate on only the data provided by a user that is related to his advertisement preference, while all other personal data, provided by the user, or recognized by the system, even if available, are not utilized for fine-tuning other automated suggestion mechanisms provided by the platform. In any event, the social networking platform at least ensures that the user's identity is protected from the third-party advertisement provider. In other words, the user, only interacts with the advertisement provider in an anonymous manner. User anonymity is protected during the entire advertisement-related interaction, starting from setting advertisement viewing preference, all the way to actually purchasing something based on advertisement served on the social networking platform, if a user chooses to do so. This emphasis on user privacy sets the social networking platform of the present invention apart from other currently available advertisement models.

Currently advertising models rely on varying intensities of ascertaining details about the individual that the advertisement is being served to. There are many ways this is done, even in advertising systems where individuals can refine their advertising choices. All current systems and models rely on data determined about the individual that is based on either data scraping, tracking cookies, other means and mechanisms, and/or analysis of the uniquely identifiable information provided by the individual to a company. Often that data is also aggregated by, shared with, and/or re-shared with one or many third parties.

Sgrouples' advertising model is based on the functional foundation of individuals being and remaining entirely anonymous during the advertising selection and delivery process in which advertisements are determined what to be and delivered/served/displayed/provided to the individual by any and all means.

Individuals remain anonymous to advertisers during the entire process in which they are selecting the advertisements they would like to receive and/or are then displayed in all of the individual's mobile devices, desktop computers, televisions, phones, portable, any and all personal electronics, etc. At no time is anything about the individual revealed to the advertiser during the selection process and the delivery of the advertisements that the individual selects during the ad selection process (prior to and not related to "clicking" on a specific served advertisement) and in any manner indicates a willingness to receive.

Optionally, if and when an individual takes a definitive action to click on an advertisement that they have received, which is received by the individual based on their inputs into the advertisement selection process, then information about that individual may be transmitted, revealed, acquired or otherwise determined or provided to the advertiser.

An alternate method for ensuring the individual is not tracked involves creating a proxy standard feature or a proxy option for the individual to hide their identity from the Advertiser, so that even when they click on or otherwise indicate a definitive interest in a specific advertisement that the individual has received, the identity and details/information about the individual remains anonymous and not discoverable; there is no way to link the identity of the individual to the ad they clicked on. This protection of the individual's identity may also optionally continue through the purchase cycle with the exception of data that must be collected in order to fulfill on the individual's purchasing desires. Here too, a third party system can optionally be enacted for fulfillment to further protect the individual's identity from the advertiser.

By fully participating in the selection of the advertisements they receive, the individual gives the Advertiser a uniquely and significantly more relevant opportunity to generate interest and sales from the individual; and also gives the individual protection from advertising systems that rely on tracking, spying, profiling and other data scraping/data sharing/data acquisition methods.

There are many benefits to this model, including, but not limited to the following.

By choosing their advertisements using some or all of the methods described above or those extrapolated from the descriptions below, the individual is demonstrably the highest value example of one-to-one correspondence between product and the consumer, as the ads provided to the individual are exactly what the individual desires. There is a much higher likelihood that the individual will "click" on their Ads and/or Coupons, generating a significantly higher "click-through rate" than current expectations and standards. Individuals are expected to make significantly more purchases though the advertisements they receive.

This model is anticipated to generate higher CPMs due to its unique relevancy to the individual and the trust that the system generates between the individual, the company, and the Advertiser.

There are many ways that such a system can function, and all have the fundamentals above as prerequisite. One exemplary way the Advertiser/Advertisement selection process is envisioned to operate is the following:

The individual can choose from a selection of consumer goods and services, for example, by starting at a top/gross level ad categories, and then optionally drilling down to select sub categories. Alternatively or additionally, the selection may be from specific companies and the sub categories, from specific products and/or services offered by the companies etc., as selected by the user. The product, service, and vendor or company selections may be based on several different types of criteria, including, but not limited to: the geographic location of the user as provided by the user or chosen by the user (and to be determined by the company); proximity of availability of location of service, location-specific pricing etc. Users may further refine their selections in many different ways, for example, the individual may enable a geolocation service or may enter their zip code or country, state, city, etc., to identify their location, and/or from a mobile or portable device they may permit the advertising service to detect their location.

An Advertisement Selector system is available within the social network platform. Advertisers may purchase a sponsorship/Advertiser position to be placed in the ad selector system.

Another example of the way the individuals can select their Ad Preferences is via a preference, ranking, or other means of creating a measurable quantity reflecting the level of preference such that as a slider or other type of GUI mechanism can be set to establish the preferential hierarchy of a user's desired or selected ad categories or choices they would like to be served. Frequency of ad serving, relative relationship of the desired categories etc. can be selected by the user, or determined by the system.

For example, for each advertising or coupon category, the user may set the slider from 0 (left) to 100 (right). The values may default to 100 (right) for each category, and the individual may then adjust certain categories downward. The values selected by the individual provide a preference coefficient for each category, allowing the algorithm to bias the frequency of displaying ads in different categories based on the User's preferences.

This same mechanism can be extended to adjusting the preference values for subcategories of Ads as well. A user may not assign the values of all the Ad preferences sliders to 0. When a user attempts to assign all the values to 0 (left), one or more of the sliders will automatically be set to 100, to allow the service to continue to serve ads.

This is simply one example/illustration, and there are several ways to implement an Ad Preference mechanism to establish the preferences and/or frequency and/or relative relationship of a user's desired or selected ad categories or choices they would like to be served as selected by the User.

For a premium level of service, a user may choose to select a "no advertisement" option while enjoying the other features of the social networking platform.

The individual may refine their ad preferences dynamically by providing feedback about any of ads they see. There are several potential ways to do this. For example, one way is that without having to revisit the ad preferences selection page, the individual can register a '+' or '−' vote for an ad that is served to them, and the algorithm will adjust the proportion of similar ads the member receives. There are many ways for a user to register their opinions/input/feedback about the ads they see; some ways could be by using numerical, qualitative, gradient, contextual, and other measuring/input/feedback mechanisms, etc.

The user also has the option to explore coupon offerings that are generated based on the criteria and/or choices they have entered for their ad preferences. In the context of the present application, "coupons" are considered to be encompassed by the broad term of "advertisement." Therefore, the advertisement filter can be thought of a system that is configured to serve coupons intelligently to the users, i.e. potential buyers. In other words, coupons offered to the user can use all the same methods for their selection and delivery as the ones for advertisements that have been described herein. Whenever a user selects or purchases a coupon, it could also be counted as a positive vote for that category in the preferential measurement system.

There can be other benefits of this Advertising/Couponing service by ensuring that the individual is anonymous and/or protected from other types of data gathering. For example, the lack of ability for tracking or information gathering of any kind on users by Advertisers can be designed into the service. In an example of one way to ensure this is enforceable, the ads are procured from an ad partner, but may actually be served to the users from the servers that belong to the social network platform provider. This is distinct from the traditional model of advertisement presentation to the users of a social network in which ads are actually served directly by a third party and included in the page that is served to the user.

Figure 13:
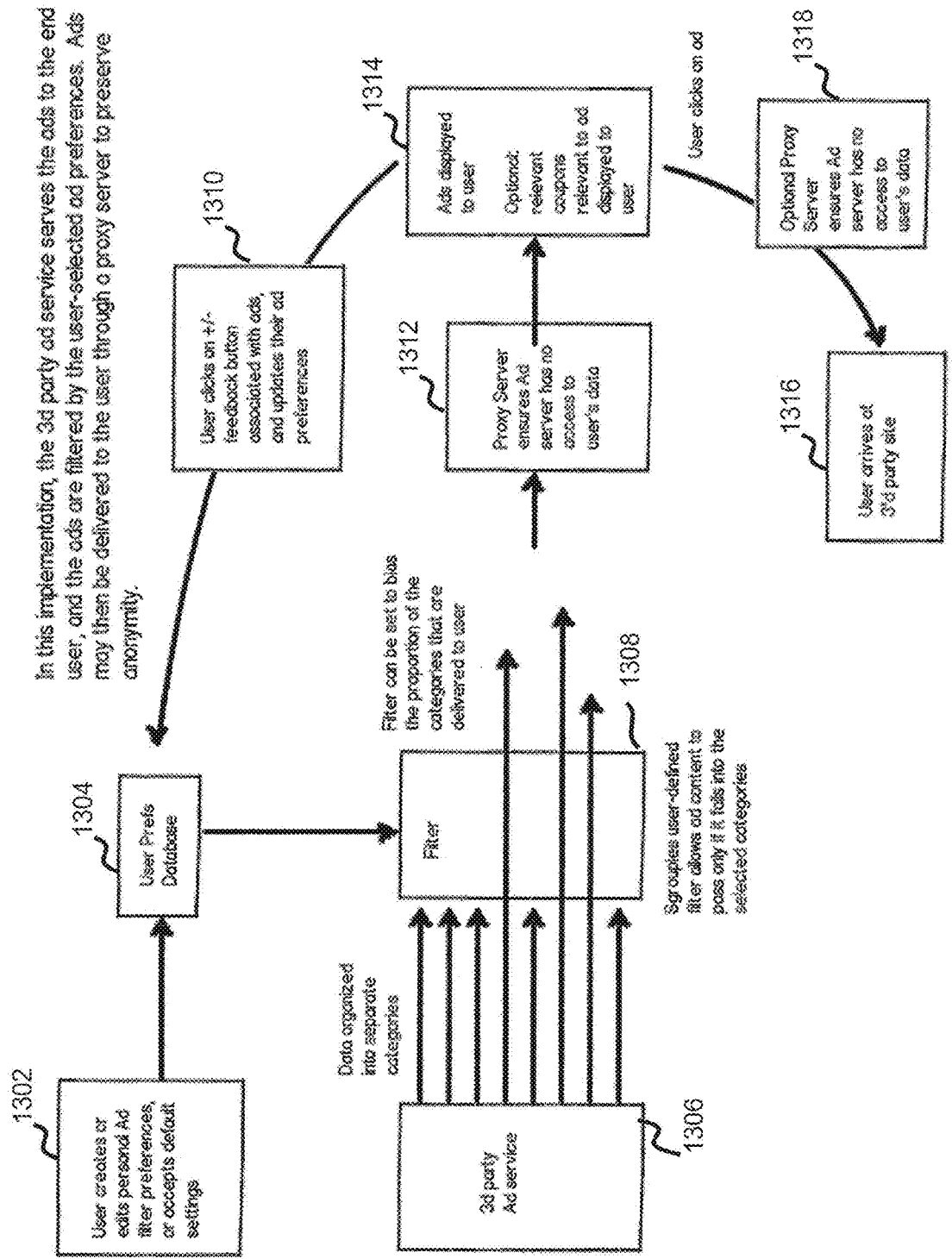
FIGS. 13 and 14 illustrate system implementation of an advertisement serving model, according to embodiments of the present invention.
Figure 14:
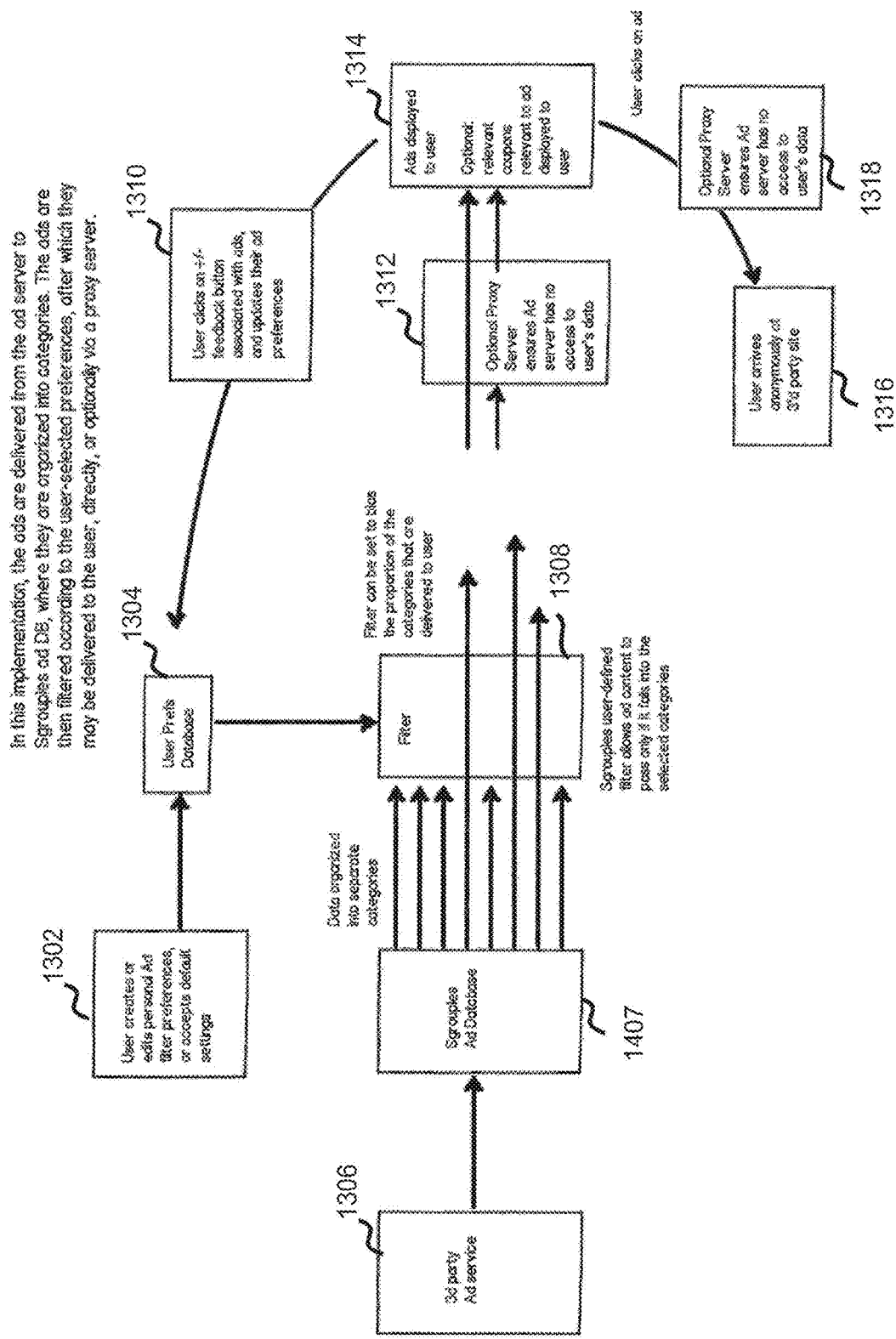

FIGS. 13 and 14 show two implementations of the ad serving system, the only difference being that the implementation in FIG. 14 has an additional component 1407, which is a Sgrouples ad database prior to the filter 1308. In both FIGS. 13 and 14, user creates or edits personal ad filter preference in step 1302, which is stored in database 1304. Third party ad service 1306 can only interact with the user on the social network platform through proxy server 1312 or other anonymization methods. The proxy server 1312 receives the third party ads and serves them to the user selectively (i.e. only the ads that pass the filtering criteria). Another optional proxy server 1318 may be placed between the user and the ad server when the user indicates a definitive intension by clicking on the ad (or even purchasing the advertised product). Relevant coupons may also be displayed to the user, as shown in step 1314.

Figure 15:
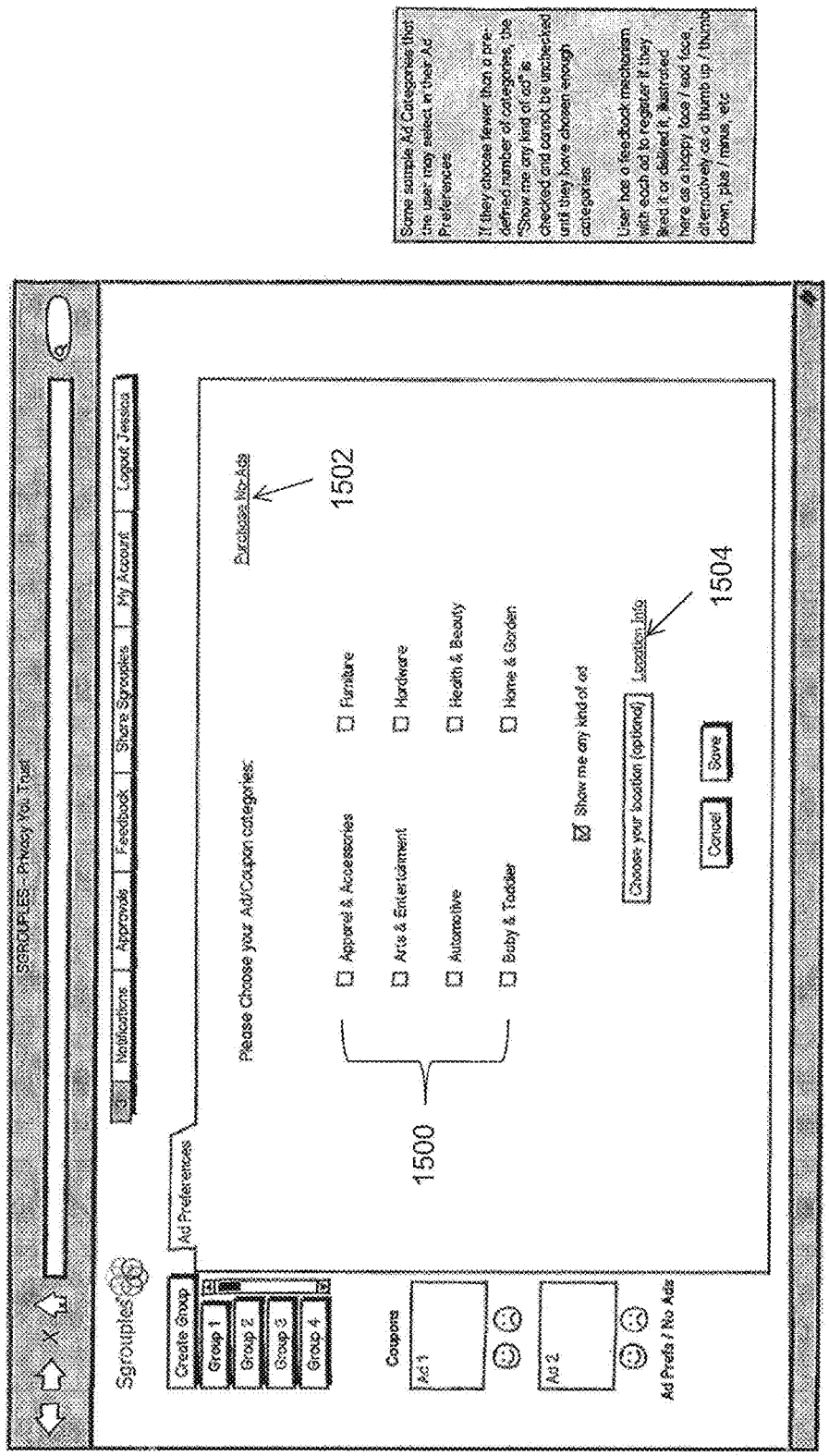
FIGS. 15-21 illustrate wireframe views depicting various features of the advertisement (and coupon) serving model, according to embodiments of the present invention.
Figure 16:
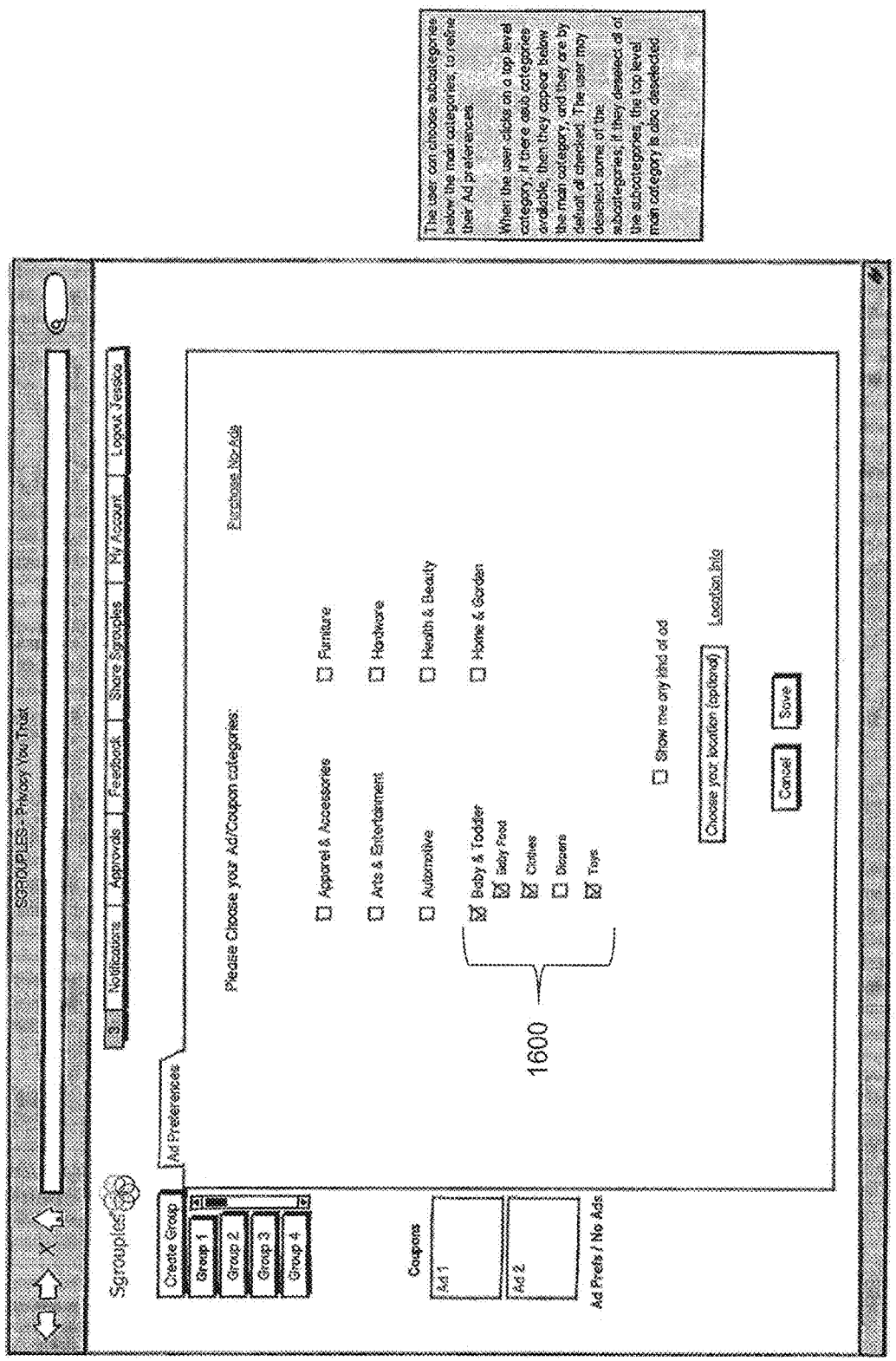
Figure 17:
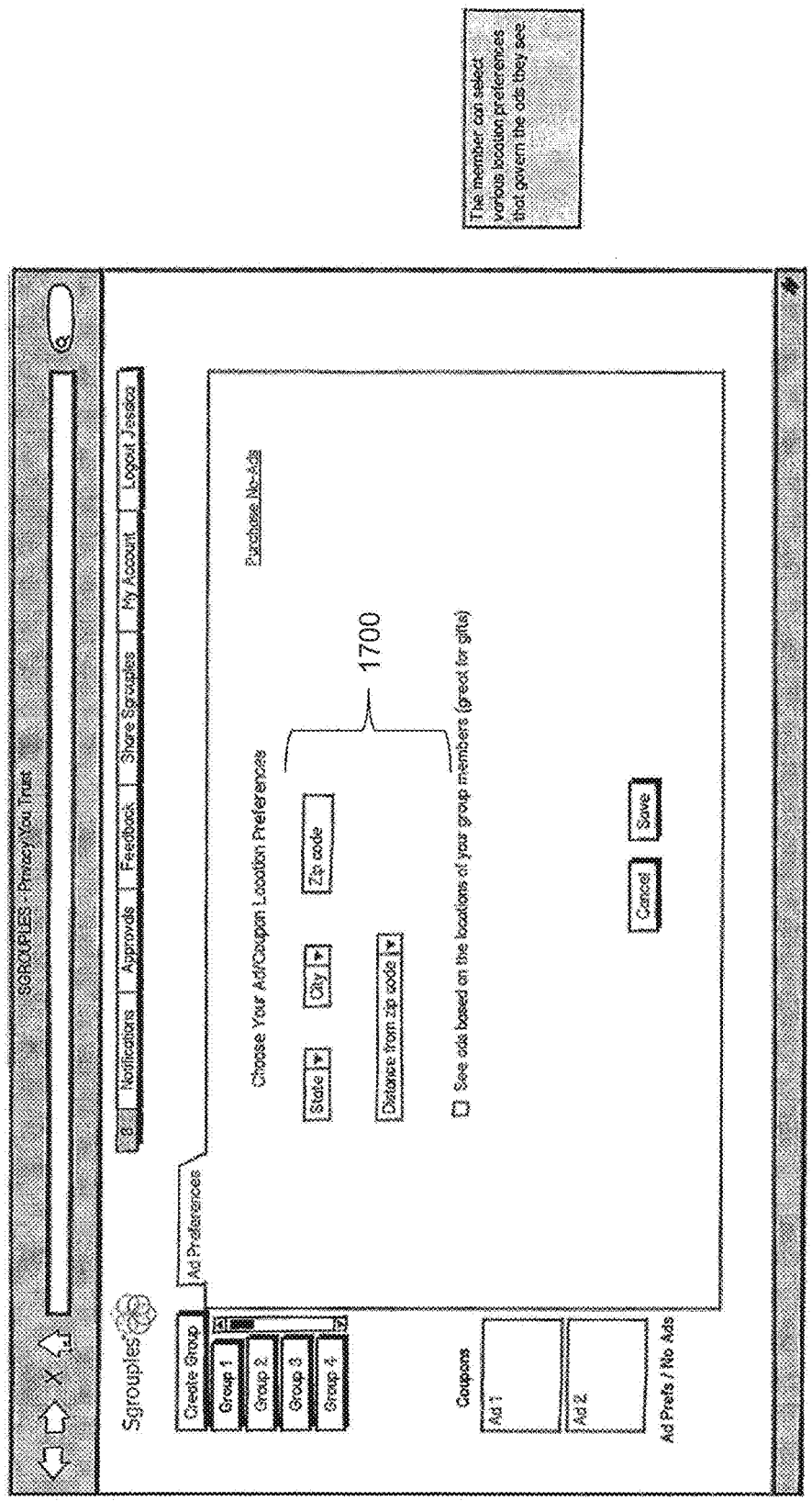
Figure 18:
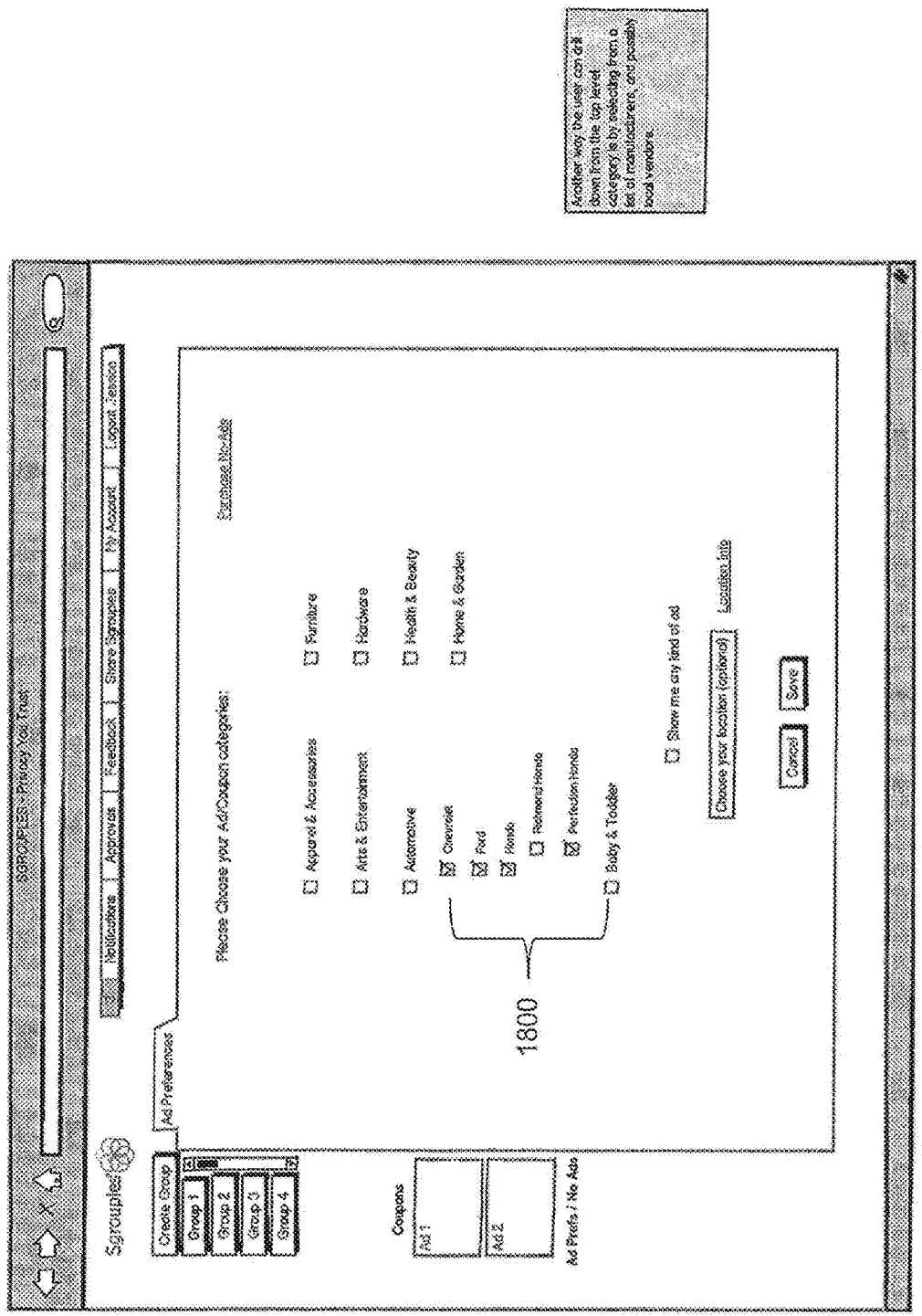
Figure 19:
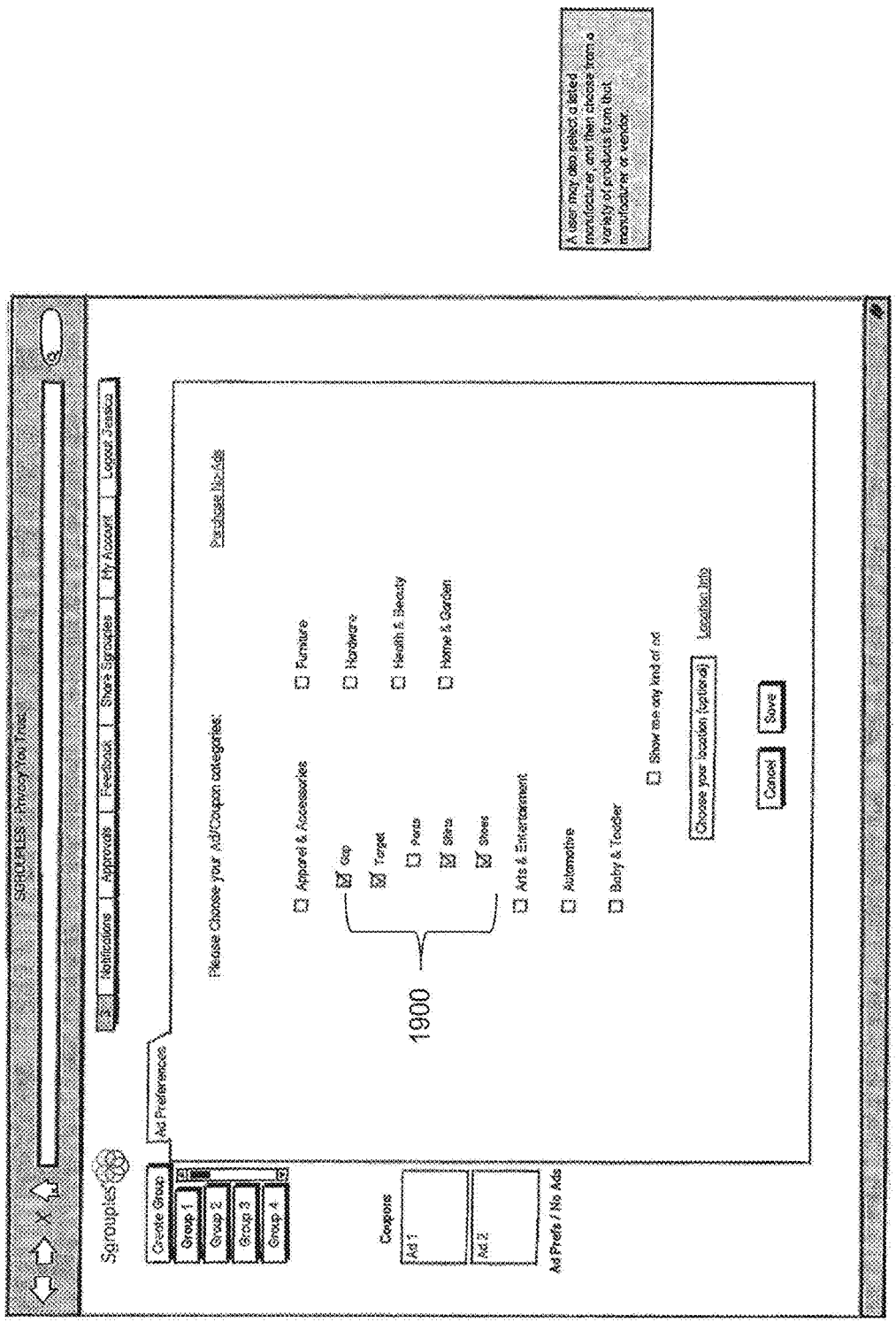

FIGS. 15-21 are wireframe diagrams showing different features of the ad model as described. Element 1502 highlights the premium option of having to see no ad at all. Element 1504 highlights an optional field associated with geolocation, if the user wants geographically relevant information, as shown in greater detail in FIG. 17 with geolocation-related information set 1700. FIG. 15 shows broad categories 1500, FIG. 16-19 show how broad categories can be broken down to sub-categories.

Figure 20:
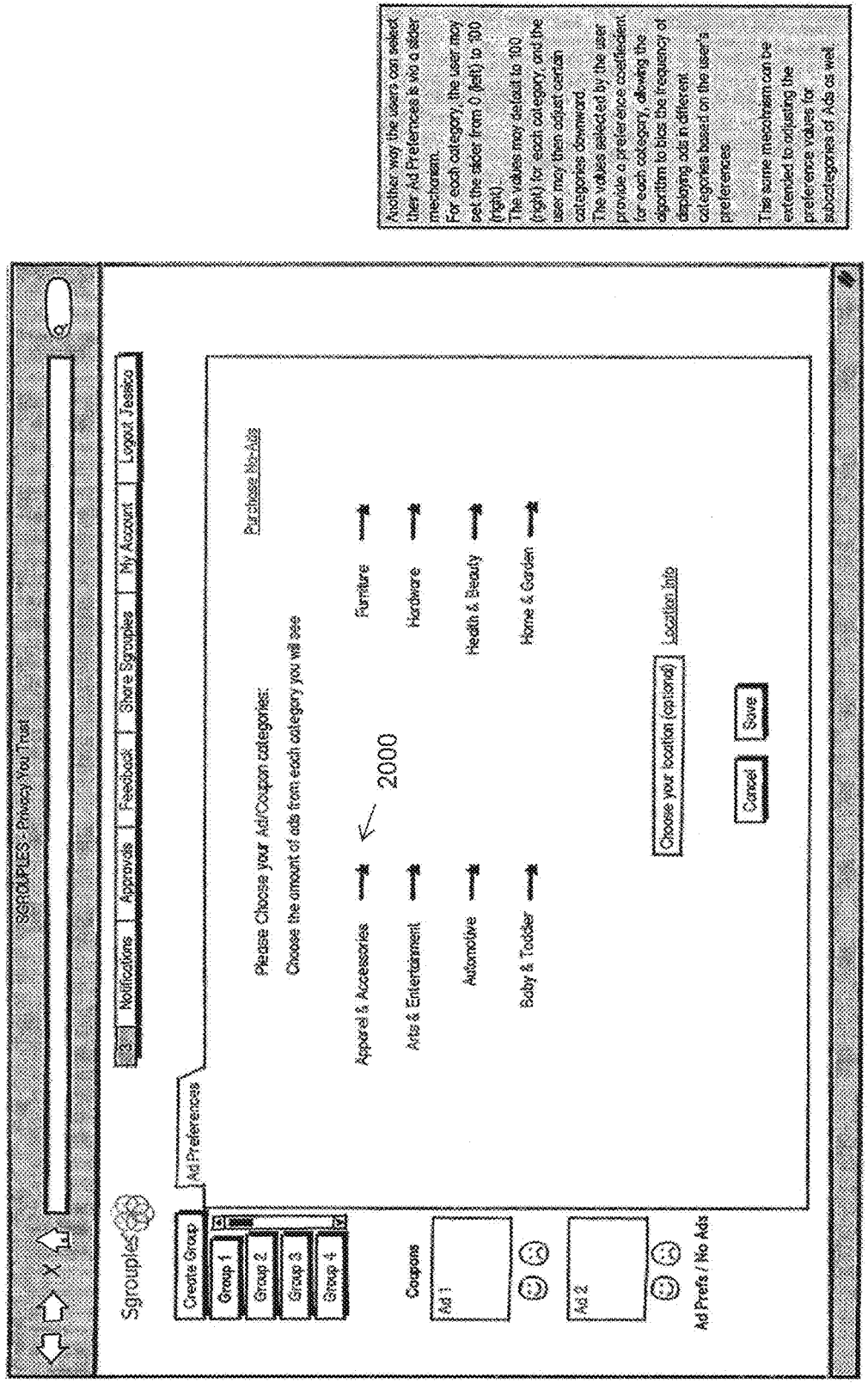
Figure 21:
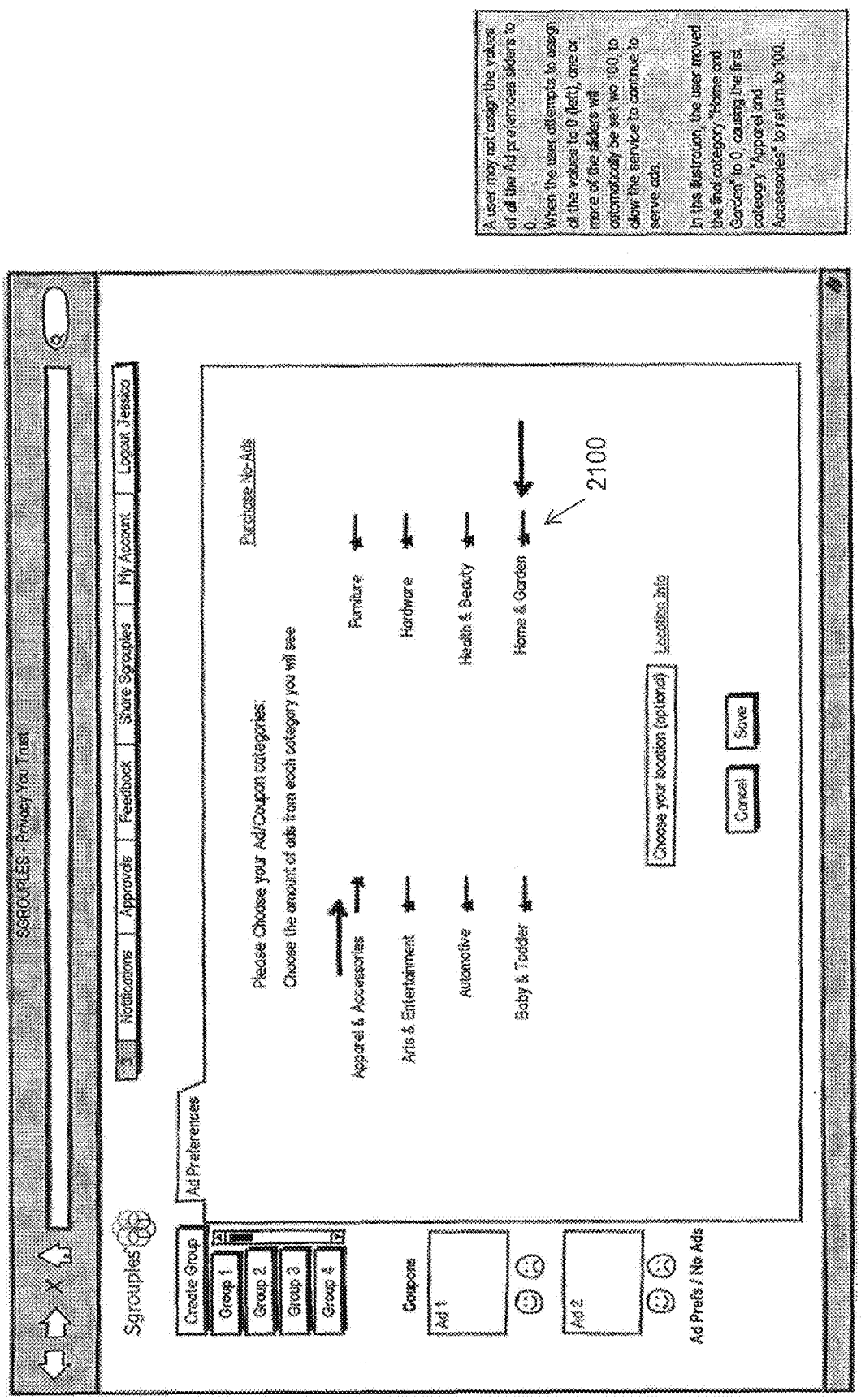

FIGS. 20 and 21 show how instead of checking boxes, ad preferences can be set by using a slider, whose two positions are shows as 2000 and 2100. Persons skilled in the art will understand the slider can be moved continually or in steps.

Tagging and Organizing

Users can tag, or categorize, items of interest within the social networking platform, within a group or even outside of a group. This allows searching for content associated with any tag or tags, and also allows the viewers to understand the relevance of a given post, and to associate it with other items with the same tag. Sgrouples provides a means for tagging any kind of information, from any service or device, and the same set of tags is used for the different information types including text posts, photos, videos, events, documents, etc. While each of these types of posts is sorted into its own service, such as photo albums or an event calendar, the tag categories apply across services, allowing the users to easily search for relevant items regardless of the type of information. This concept is sometimes referred to as "universal tagging."

The tag categories span the various types of information within a group, and they can also span across groups. In this case a user can add the same tag to different pieces of information in several of their groups, and they can also search by tags and find information in any of their groups. This also implies that some users may not be able to see all the pieces of content associated with a given tag, as they may not be members of all the groups with that tag, and consequently they lack permission to see some of the tagged items.

Embodiments of the present invention provides means to identify and associate information shared within a group that may be of different types (e.g. text, photos, videos, documents, etc), means to identify and associate information shared among different groups that may be of different types (e.g. text, photos, videos, documents, etc), means to search for items that are tagged, regardless of what type of info they are (text, photo, video, document, etc) and whether they are in a single group or in several groups.

Persons skilled ion the art will easily recognize that tagging is a very efficient and versatile way to organize content for easy retrieval. This can be done during the upload process, or afterward, and any member of a group with posting permissions can assign tags to any shared documents in their group. The owner of a doe may also assign their own private tags to the doc in their My Cloud. In one way to do this, these tags are not shared with the groups; another way to do this is to share private tags in My Cloud with the owners groups. The tags in one group are not visible to the members of another group. While viewing their does, the user may sort and filter based on one or more tags, as well as by owner, date uploaded, date modified, etc.

Tags may also be presented in a simpler fashion, in which the does appear organized into folders, or categories, instead of tags, but the underlying architecture is similar. This is equivalent to sorting documents based on one tag at a time. This is similar to the functioning of the photo service, in which photos are sorted into albums, and they can also be sorted by tags. It is also analogous to the functioning of tags/categories for "Discussions" posts in Sgrouples.

After a post is uploaded, it may be edited and tagged with one or more global tags that are shared by the group. Clicking the "Tag" link opens a small widget that contains any existing tags used by the group, as well as a "New Tag" input field. By default, only the poster may tag a post, but in some permissions configurations, other members may add tags, including tags of member names, to associate a post with a specific person in the group.

A "Discussions" post may also be directed to specific, individual members of one or more groups via the Direct Message mechanism. Viewing by Tag is possible. Choosing a selection from the select box at the top of the viewing window filters the stream and only shows the posts from that tag category. The select box starts with "All," and also contains an "Add Tag" option, which is an entry field for user to enter a new tag.

Another way to implement this would be as a subset of the full set of available tags, and only allowing one tag per item, which can then be considered as a "Category". Users can select a category to assign to a given post, and then they can filter the stream of Discussions posts by category.

Another mechanism for utilizing smart tagging is "sorting." In the Maxi widget view, the user can sort the stream of posts by Date, Alphabetical (based on link title, which may not always exist), Member name, and Most Popular (defined by a combination of most commented on, most clicked on and most shared.)

The user's shared Discussions posts also show up in their My Cloud. In My Cloud, the posts are shown with dots to indicate which groups they've been shared with. A post that has been tagged in one group does not necessarily reflect that tag in another group it may be shared with. In My Cloud, the item may display different tags in the different groups it is shared with. In this way tags are conceptually distinct from shared albums or folders.

Figure 12:
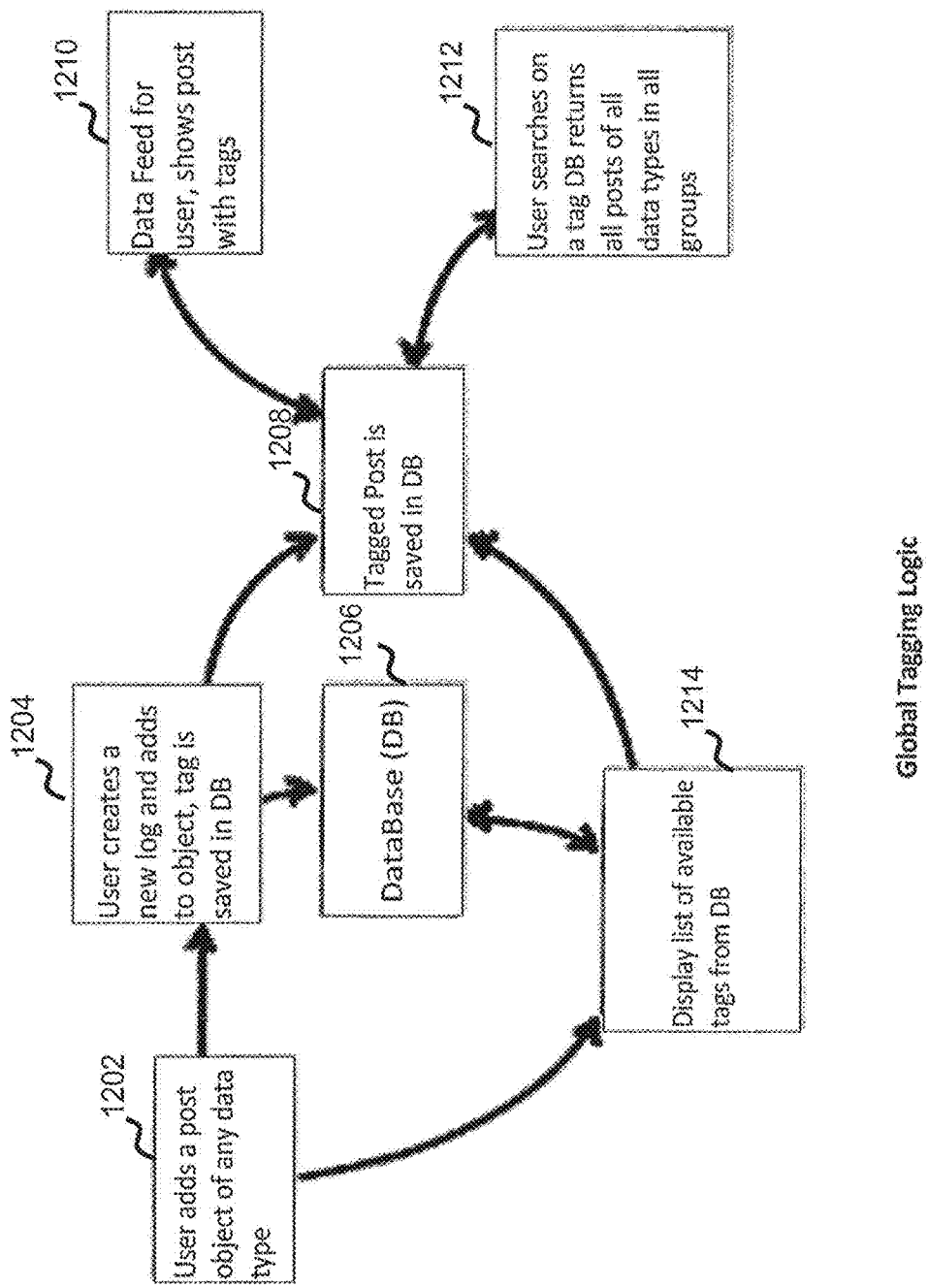
FIG. 12 illustrates a logic flow for the global tagging feature, according to embodiments of the present invention.

In the present invention the global tagging mechanism can be implemented as shown in FIG. 12, in which a post of any data type is added in 1202. The list of existing tags that the user has access to is retrieved from the Database in 1206 and displayed to the user in 1214. Alternatively, the user may create a new tag in 1204 that is then added to the DB for future retrieval. The posted content is then associated with the tag and this relationship is captured in the DB in 1208. When any user who has access to that content views the content, the tag is attached to it. Finally, when any user who has access to that tag and searches for content matching the specific tag, all post items that the user has access to, of all content types, are displayed in 1212.

Although the present invention has been particularly described with reference to the preferred embodiments thereof, it should be readily apparent to those of ordinary skill in the art that changes and modifications in the form and details may be made without departing from the spirit and scope of the invention. It is intended that the invention encompasses such changes and modifications.

What is claimed is:

1. A method of providing a message, the method comprising:
   receiving identity information corresponding to a user of an interactive service, the interactive service having an operator;
   determining a message viewing preference of the user;
   determining, based on the message viewing preference, first message criteria;
   receiving, from a message author, a first message;
   in accordance with a determination that the first message satisfies the first message criteria, presenting the first message to the user;
   receiving, from the user, input corresponding to the first message;
   anonymizing the input with respect to the message author; and
   communicating the anonymized input to the message author,
   wherein:
   the input is not communicated to the operator of the interactive service,
   the identity information is not communicated to the message author, and
   the identity information is not communicated to the operator of the interactive service.

2. The method of claim 1, wherein presenting the first message comprises presenting the first message to the user via a third party.

3. The method of claim 1, wherein the first message is associated with an item and the input indicates a request by the user to purchase the item.

4. The method of claim 3, wherein:
   the request comprises a request that a supplier provide the item, and
   the identity information is not communicated to the supplier.

5. The method of claim 3, wherein the first message comprises a coupon corresponding to the item.

6. The method of claim 1, wherein the first message comprises an advertisement and the message author comprises an advertiser.

7. The method of claim 1, wherein the interactive service comprises a content distribution platform.

8. The method of claim 1, wherein the interactive service comprises a social network platform.

9. The method of claim 1, the method further comprising receiving preference information, wherein the message viewing preference is determined based on the preference information.

10. A non-transitory computer readable medium comprising instructions which, when executed by one or more processors, cause the one or more processors to execute a method comprising:
    receiving identity information corresponding to a user of an interactive service, the interactive service having an operator;
    determining a message viewing preference of the user;
    determining, based on the message viewing preference, first message criteria;
    receiving, from a message author, a first message;
    in accordance with a determination that the first message satisfies the first message criteria, presenting the first message to the user;
    receiving, from the user, input corresponding to the first message;
    anonymizing the input with respect to the message author; and
    communicating the anonymized input to the message author,
    wherein:
    the input is not communicated to the operator of the interactive service,
    the identity information is not communicated to the message author, and
    the identity information is not communicated to the operator of the interactive service.

11. The non-transitory computer readable medium of claim 10, wherein presenting the first message comprises presenting the first message to the user via a third party.

12. The non-transitory computer readable medium of claim 10, wherein the first message is associated with an item and the input indicates a request by the user to purchase the item.

13. The non-transitory computer readable medium of claim 12, wherein:
    the request comprises a request that a supplier provide the item, and
    the identity information is not communicated to the supplier.

14. The non-transitory computer readable medium of claim 12, wherein the first message comprises a coupon corresponding to the item.

15. The non-transitory computer readable medium of claim 10, wherein the first message comprises an advertisement and the message author comprises an advertiser.

16. The non-transitory computer readable medium of claim 10, wherein the interactive service comprises a content distribution platform.

17. The non-transitory computer readable medium of claim 10, wherein the interactive service comprises a social network platform.

18. The non-transitory computer readable medium of claim 10, wherein the method further comprises receiving preference information, and wherein the message viewing preference is determined based on the preference information.

19. A system comprising:
    one or more processors;
    memory storing instructions, which when executed by the one or more processors cause the one or more processors to execute a method comprising:
    receiving identity information corresponding to a user of an interactive service, the interactive service having an operator;
    determining a message viewing preference of the user;
    determining, based on the message viewing preference, first message criteria;
    receiving, from a message author, a first message;
    in accordance with a determination that the first message satisfies the first message criteria, presenting the first message to the user;
    receiving, from the user, input corresponding to the first message;

anonymizing the input with respect to the message author; and communicating the anonymized input to the message author, wherein:

the input is not communicated to the operator of the interactive service, the identity information is not communicated to the message author, and the identity information is not communicated to the operator of the interactive service.

20. The system of claim 19, wherein the message comprises an advertisement and the message author comprises an advertiser.

* * * * *